United States Patent [19]
Martz et al.

[11] 3,965,675
[45] June 29, 1976

[54] COMBINED CYCLE ELECTRIC POWER PLANT AND A HEAT RECOVERY STEAM GENERATOR HAVING IMPROVED BOILER FEED PUMP FLOW CONTROL

[75] Inventors: Lyle F. Martz, Verona, Pa.; Richard J. Plotnick, Cherry Hill, N.J.

[73] Assignee: Westinghouse Electric Corporation, Pittsburgh, Pa.

[22] Filed: Aug. 8, 1974

[21] Appl. No.: 495,724

[52] U.S. Cl. .............................. 60/39.18 B; 60/658; 122/406 S
[51] Int. Cl.² ................... F01K 23/10; F01K 13/02
[58] Field of Search............ 122/406 S; 60/660–667, 60/39.18 B, 658

[56] References Cited
UNITED STATES PATENTS
3,267,911  8/1966  Heathcote .................... 122/406 S Primary Examiner—Allen M. Ostrager
Attorney, Agent, or Firm—E. F. Possessky

[57] ABSTRACT

A combined cycle electric power plant includes gas and steam turbines and a steam generator for recovering the heat in the exhaust gases exited from the gas turbine and for using the recovered heat to produce and supply steam to the steam turbine. The steam generator includes an economizer tube and a high pressure evaporator tube and a boiler feed pump for directing the heat exchange fluid serially through the aforementioned tubes. A condenser is associated with the steam turbine for converting the spent steam into condensate water to be supplied to a deaerator for removing undesired air and for preliminarily heating the water condensate before being pumped to the economizer tube. Condensate flow through the economizer tube is maintained substantially constant by maintaining the boiler feed pump at a predetermined, substantially constant rate. A bypass conduit is provided to feed back a portion of the flow heated in the economizer tube to the deaerator; the portion being equal to the difference between the constant flow through the economizer tube and the flow to be directed through the high pressure evaporator tube as required by the steam turbine for its present load.

27 Claims, 19 Drawing Figures

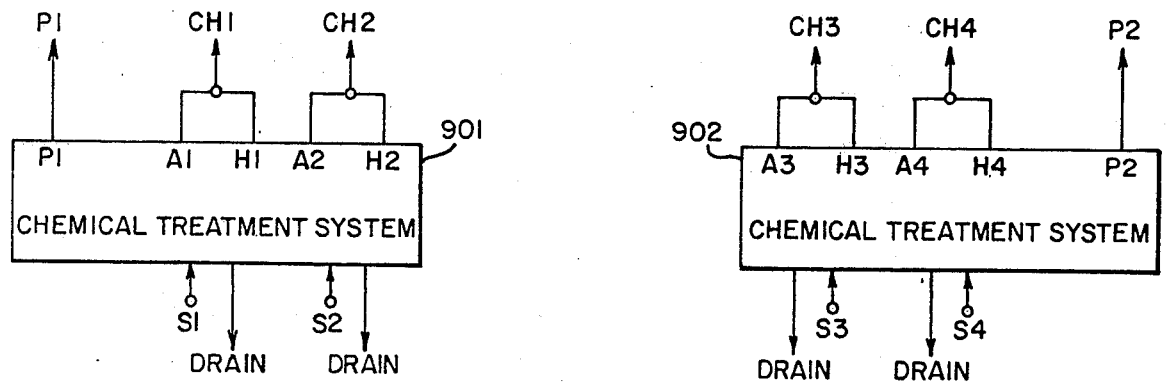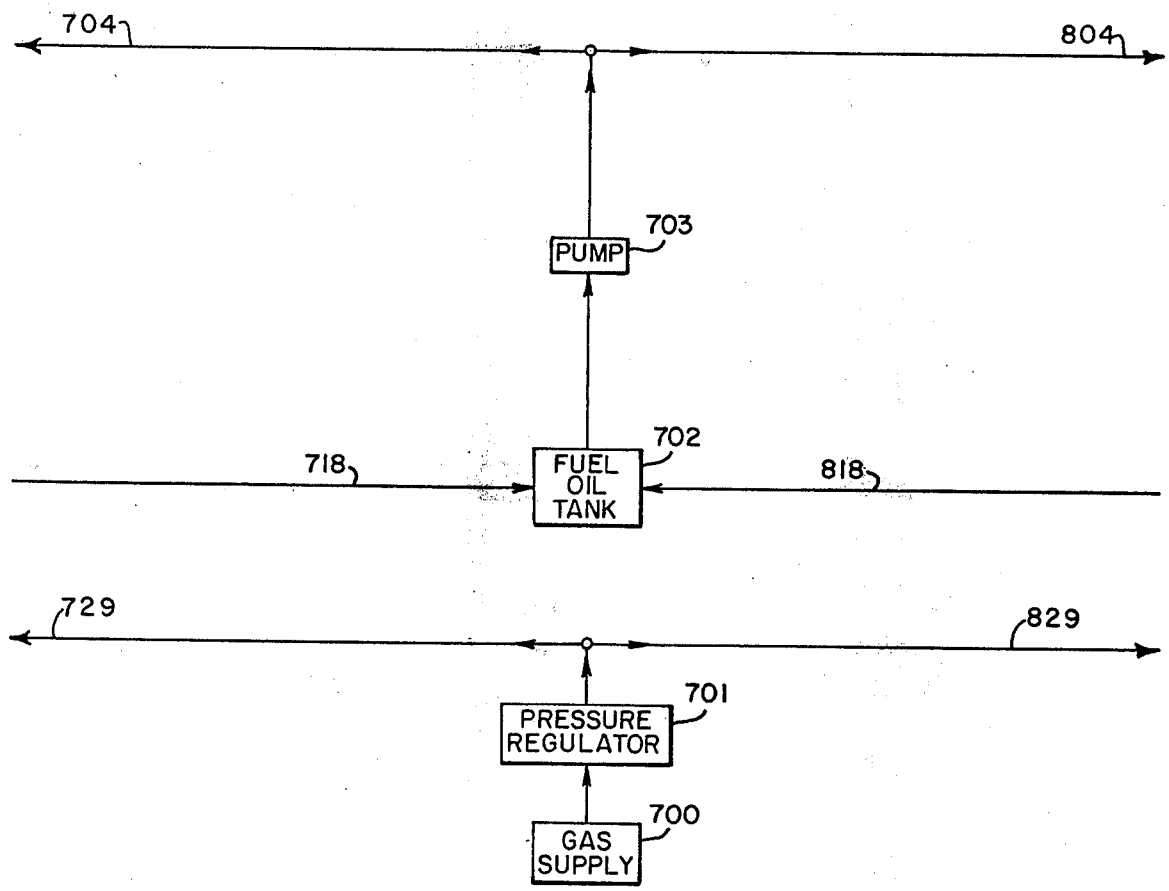
FIG. 5E

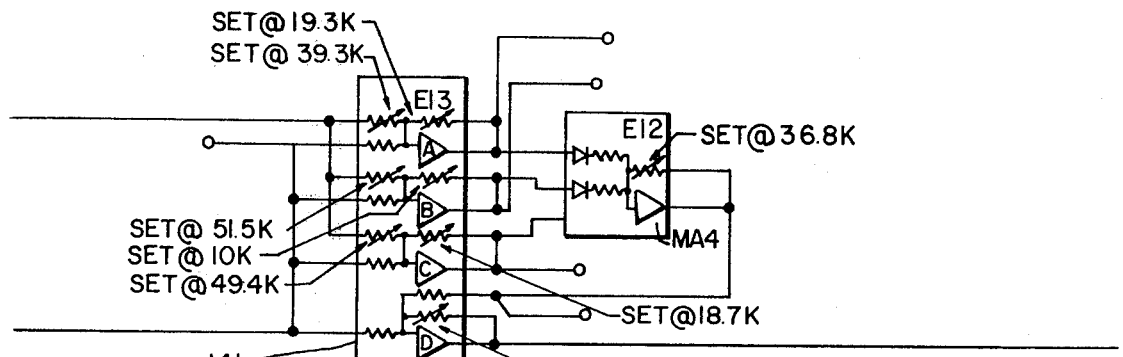
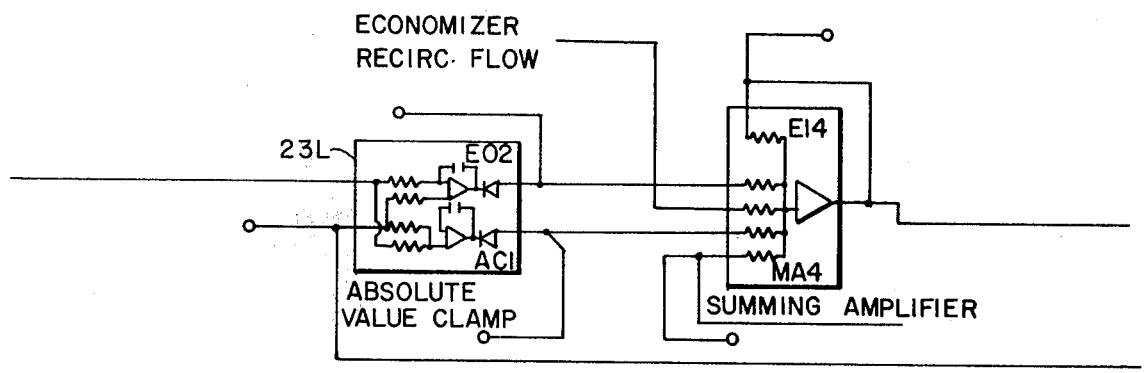
FIG.9B

COMBINED CYCLE ELECTRIC POWER PLANT AND A HEAT RECOVERY STEAM GENERATOR HAVING IMPROVED BOILER FEED PUMP FLOW CONTROL

CROSS-REFERENCE TO RELATED APPLICATION

Reference is made to application Ser. No. 495,765, filed concurrently herewith by Lyle F. Martz and Richard J. Plotnick, entitled "Combined Cycle Electric Power Plant Having a Control System Which Enables Dry Steam Generator Operation During Gas Turbine Operation" and assigned to the present assignee and related cases referred to therein, said designated case and said referred to cases being incorporated herein by reference.

BACKGROUND OF THE INVENTION

1. Field of the Invention

The present invention relates to combined cycle electric power plants and more particularly to improved heat recovery steam generator control especially useful in the operation of steam generators in combined cycle electric power plants.

2. Description of the Prior Art

In the design of modern electric power plants, it is a significant object to achieve the greatest efficiency possible in the generation of electricity. To this end, steam generators are designed to extract heat sufficiently from and to use heat to convert a fluid such as water into superheated steam at a relatively high pressure. Further, such steam generators have been incorporated into combined cycle electric generating plants including both gas and steam turbines wherein the exhaust gases of the gas turbine are used to heat water into steam to then be transferred to the steam turbine.

Typically, steam generators include a water heating section or economizer tube, an evaporator tube and finally a superheater tube whereby water is gradually heated while increasing levels of pressure are applied thereto to provide from the superheater tube superheated steam to be supplied to the steam turbine. A condenser is associated with the steam turbine to receive the spent steam and for converting it into water condensate to be fed back to the steam generator. In particular, a feedwater pump supplies the condensate through the economizer, evaporator and superheater tubes, wherein the condensate is sequentially heated and additional pressure applied thereto. In the operation of steam generators, it is necessary to maintain a minimum rate of circulation of water or other transfer fluid in the heating tube while heat is being applied thereto in order to prevent the burning of the tubes forming the walls of the furnace. If a minimum flow rate is not established, hot spots may develop within certain portions of the tubes whereby steam is generated locally at these spots thereby tending to block the flow of fluid therethrough with the eventual stagnation of the tube and possible significant damage thereto.

In a combined cycle electric power plant, a steam turbine is combined with a gas turbine whereby the heated exhaust gases of the turbine, otherwise lost to the atmosphere, are used to heat the circulated fluid and to convert it into steam to drive the steam turbine. In this manner, a significant reduction in the fuel required to heat the steam is achieved and the heat contained in the gas turbine exhaust gases is effectively utilized, because flow through the economizer tube is high at low steam rates. Typically in such combined cycle electric power plants, a deaerator is incorporated in the return conduit from the condenser to the steam generator for removing air from the feedwater and also to provide initial heating to the feedwater before it is supplied to the economizer tube. Heat may be provided from the steam turbine itself whereby steam is extracted between selected stages of the steam turbine and is selectively fed to the deaerator, to be sprayed therein whereby the returned condensate is exposed to the sprayed steam, thus raising the temperature of the condensate. However, extraction steam is available from the steam turbine only when it is being operated in the range of 85–95% of full load. Thus, at relatively low loads, the feedwater entering the deaerator is not heated by extraction steam, but is heated at a relatively low load by the economizer tube.

Further, at relatively low loads as imposed upon the combined cycle electric power plant, it is not necessary to extract significant amounts of heat from the exhaust gases of the gas turbine, the heat therein being dissipated into the atmosphere through a louvre at the top of the steam generator. In the prior art steam generators, significant heat is lost, especially at relatively low operating loads.

Steam generators are known, for example that described in U.S. Pat. No. 3,038,453, of the force flow once-through type in which a portion of the transfer fluid is recirculated. In particular, recirculation paths are provided about each section or portion of the steam generator, i.e., the economizer, evaporator and superheater tubes. Thus, at relatively low steam turbine load, e.g., below 30% of full load, an additional amount of the working fluid is recirculated through the heating tubes whereby a minimum flow rate is established to prevent possible damage, e.g., burnout, of these tubes.

The description of prior art herein is made on good faith and no representation is made that any prior art considered is the best pertaining prior art nor that the interpretation placed on it is unrebuttable.

SUMMARY OF THE INVENTION

It is therefore an object of this invention to improve the efficiency of generating steam by a steam generator associated with a steam turbine, particularly at relatively low loads of the steam turbine.

It is a further object of this invention to provide a new and improved combined cycle electric power plant whereby heat is efficiently recovered from the exhaust gases of the gas turbine to generate heat to drive the system's steam turbine.

These and other objects are accomplished in accordance with the teachings of this invention by providing a combined cycle electric power plant including a gas turbine, a steam turbine, means for generating electric power under the driving power of the turbines, and steam generating means for receiving the exhaust gases of the gas turbine and for using the heat therein to convert the transfer fluid such as water into steam to be supplied to the steam turbine. The steam generating means of this invention includes at least first and second heat transfer tubes, e.g., the economizer and high pressure evaporator tubes, to which feedwater as supplied from a condenser associated with the steam turbine is directed by a feedwater pump. A recirculation conduit is provided between the outlet of the first heat exchange tube and its inlet, whereby a portion of the heated fluid is returned. The steam generating control includes a pump control for operating the feedwater pump at a substantially constant rate, whereby a substantially constant flow rate is established through the economizer tube, and a valve control for effectively controlling the opening of a recirculation valve inserted within the recirculation conduit whereby the recirculation flow of the heated water is set according to the difference between the substantially constant flow established within the first heat exchange tube and that flow as required to the second heat exchange tube; typically, the second mentioned flow is set in accordance with the steam requirements of the steam turbine for a particular load placed thereon.

In one illustrative embodiment of this invention, a deaerator is inserted between the inlet of the first heat exchange tube and the feedwater path for the condenser, for removing air from the water condensate and for preliminarily heating the water before it is supplied to the first heat exchange tube. The recirculation conduit is coupled to the deaerator whereby a portion of the heated water in the first heat exchange tube is supplied thereto to supply heat to the deaerator to increase the degree of preliminary heating provided thereby and to minimize the heat as supplied by other sources, e.g., the intermediate stages of the steam turbine. Further, a storage tank may be inserted between the output of the deaerator and the inlet of the first heat exchange tube for storing water and, in effect, to store heat otherwise dissipated, as returned by the recirculation conduit.

In one particular embodiment of this invention, the pump control includes a first subtraction circuit responsive to the output of a flowmeter coupled in the path between the first and second heat exchange tubes and a generated bias signal indicative of the constant flow through the first heat exchange tube to provide a difference signal to control the opening of the recirculation control valve. Further, a trim signal is generated indicative of the difference between the calculated recirculation flow as derived above and the signal output of a further flowmeter coupled within the recirculation conduit. The trim signal is summed with the calculated signal to thereby eliminate any discrepancies introduced by the system, e.g. operational errors of the recirculation control valve.

BRIEF DESCRIPTION OF THE DRAWINGS

These and other objects and advantages of the present invention will become more apparent by referring to the following detailed description and accompanying drawings, in which:

FIGS. 5A to 5F show schematically in detail the fluid interconnections between the gas turbines, the steam turbine and the steam generators as generally shown in FIG. 1, and FIG. 5G shows the manner in which FIGS. 5A to 5F are arranged;

FIGS. 9A to 9F show in detail the circuitry which may be employed to embody the various functional blocks shown in FIG. 8, and FIG. 9G shows how these figures are tied together.

DESCRIPTION OF THE PREFERRED EMBODIMENT

A. General Plant Description

Figure 1:
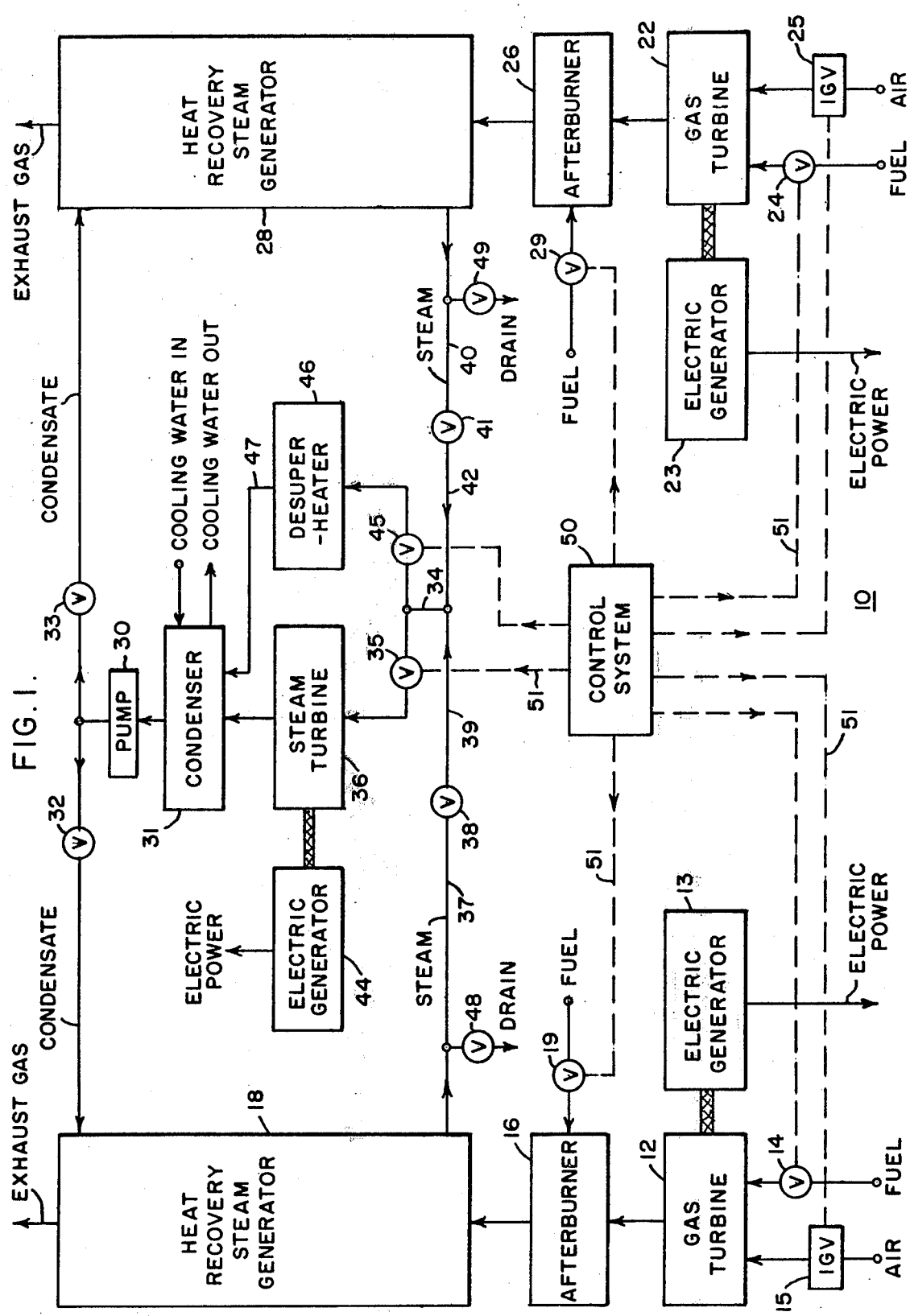
FIG. 1 shows a schematic view of a combined cycle electric power plant in which there is employed a heat recovery steam generator in accordance with the principles of this invention.

Referring to FIG. 1 of the drawings, there is shown a functional block diagram of a representative embodiment of a combined cycle electric power generating plant constructed in accordance with the present invention. Reference numeral 10 is used to identify the combined cycle plant as a whole. As such, the plant 10 includes a first gas turbine 12 (sometimes referred to as "gas turbine No. 1") which drives a first electric generator 13. Fuel is supplied to the gas turbine 12 by way of a fuel control valve or throttle valve 14. Air enters the gas turbine 12 by way of a variable inlet guide vane mechanism 15 which controls the degree of opening of the turbine air intake and which is used to adjust air flow during the startup phase and to increase part load efficiency. The fuel supplied by the throttle valve 14 is burned in the gas turbine 12 and the resulting high temperature exhaust gas is passed through an afterburner 16 and a heat recovery steam generator 18 and is thereafter exhausted into the atmosphere.

Heat recovery steam generator 18 (sometimes referred to as heat recovery steam generator No. 1) includes therein various sets of boiler tubes which are heated to a relatively high temperature by the gas turbine exhaust gas passing through the steam generator 18. Afterburner 16 includes a burner mechanism for further increasing the temperature of the gas turbine exhaust gas before it enters the steam generator 18. Fuel is supplied to the burner mechanism in the afterburner 16 by way of a fuel control valve or throttle valve 19. The primary heat source for the steam generator 18 is the gas turbine 12, the afterburner 16 being in the nature of a supplemental heat source for providing supplemental heat when needed. In terms of typical fuel usage, approximately 80% of the fuel is used in the gas turbine 12 and 20% is used in the afterburner 16.

The combined cycle plant 10 further includes a second gas turbine 22 (sometimes referred to as gas turbine No. 2) which drives a second electric generator 23. Fuel is supplied to the gas turbine 22 by way of a fuel control valve or throttle valve 24. Air enters the gas turbine 22 by way of a variable inlet guide vane mechanism 25 which is used to adjust air flow during turbine startup and to increase part load efficiency. The fuel supplied by throttle valve 24 is burned in the gas turbine 22 and the resulting high temperature exhaust gas is passed through an afterburner 26 and a heat recovery steam generator 28 and is thereafter exhausted into the atmosphere.

Heat recovery steam generator 28 (sometimes referred to as heat recovery steam generator No. 2) includes various sets of boiler tubes which are heated to a relatively high temperature by the gas turbine exhaust gas passing through the steam generator 28. Afterburner 26 includes a burner mechanism for further increasing the temperature of the gas turbine exhaust gas before it enters the steam generator 28. Fuel is supplied to the burner mechanism in the afterburner 26 by way of a fuel control valve or throttle valve 29. The primary heat source for the steam generator 28 is the gas turbine 22, the afterburner 26 being in the nature of a supplemental heat source for providing supplemental heating when needed. In terms of typical total fuel consumption, approximately 80% of the fuel is used in the gas turbiine 22 and 20% is used in the afterburner 26.

A condensate pump 30 pumps water or condensate from a steam condenser 31 to both of the steam generators 18 and 28, the condensate flowing to the first steam generator 18 by way of a condensate flow control valve 32 and to the second steam generator 28 by way of a condensate flow control valve 33. Such condensate flows through the boiler tubes in each of the steam generators 18 and 28 and is converted into superheated steam. The superheated steam from both of the steam generators 18 and 28 is supplied by way of a common header or steam pipe 34 and a steam throttle valve or control valve 35 to a steam turbine 36 for purposes of driving such steam turbine 36. The steam from the first steam generator 18 flows to the header 34 by way of a steam pipe 37, an isolation valve 38 and a steam pipe 39, while steam from the second steam generator 28 flows to the header 34 by way of a steam pipe 40, an isolation valve 41 and a steam pipe 42.

The spent steam leaving steam turbine 36 is passed to the condenser 31 wherein it is condensed or converted back into condensate. Such condensate is thereafter pumped back into the steam generators 18 and 28 to make more steam. Steam turbine 36 drives a third electric generator 44.

A steam bypass path is provided for use at appropriate times for diverting desired amounts of steam around the steam turbine 36. This steam bypass path includes a steam turbine bypass valve 45 and a desuperheater 46, the output side of the latter being connected to the condenser 31 by way of a pipe 47. A drain valve 48 is provided for the first steam generator 18, while a drain valve 49 is provided for the second steam generator 28.

The operation of the combined cycle electric power generator plant 10 is controlled by a control system 50, typical control signal lines 51 being shown in a broken line manner. As will be seen, the control system 50 offers a choice of four different control operating levels providing four different degrees of automation. From highest to lowest in terms of the degree of automation, these control operating levels are: (1) plant coordinated control; (2) operator automatic control; (3) operator analog control; and (4) manual control. The control system 50 includes an analog control system which is constructed to provide complete and safe operation of the total plant 10 or any part thereof. The control system 50 also includes a digital computer that provides a real-time digital control system that works in conjunction with the analog control system at the higher two levels of control to coordinate and direct the operation of the analog control system. Failure of the digital control computer results in no loss of power generation because the analog control system provides for complete operation of the plant 10.

When operating at the highest level of control, namely, at the plant coordinated control level, the control system 50, among other things, automatically coordinates the settings of the fuel valves 14, 19, 24 and 29, the inlet guide vanes 15 and 25 and the steam turbine throttle and bypass valves 35 and 45 to provide maximum plant efficiency under static load conditions and optimum performance during dynamic or changing load conditions.

The control system 50 also enables a coordinated automatic startup or shutdown of the plant 10 such that the plant 10 can be brought from a hot standby condition to a power generating condition or vice versa in a quick, efficient and completely automatic manner. For example, the entire plant 10 can be started and brought to full load from a hot standby condition in approximately 60 minutes time by having the plant operator simply dial in the desired load setting and push a master plant start button.

As an indication of the flexibility and reliability of the power generating plant 10, it is noted that the plant 10 can be operated in any one of the following configurations: (1) using one steam turbine and two gas turbines; (2) using one steam turbine and one gas turbine; (3) using two gas turbnes only; and (4) using one gas turbine only. The steam turbine 36 will, of course, not operate by itself, it being necessary to use at least one of the gas turbines 12 and 22 in order to use the steam turbine 36. In order to obtain the benefits of combined cycle operation, it is, of course, necessary to use the steam turbine 36 and at least one of the gas turbines 12 and 22. When one of the gas turbines, for example the gas turbine 12, is not being used or is shut down for maintenance purposes, then its associated steam generator 18 can be removed from the system by closing its condensate flow valve 32 and its steam isolation valve 38. When, on the other hand, the steam turbine 36 is not being used or is shut down for maintenance purposes, the steam generated by the steam generators 18 and 28 can be bypassed to the condenser 31 by way of steam bypass valve 45 and the desuperheater 46. As an alternative, when the steam turbine 36 is not being used, either one or both of the steam generators 18 and 28 can be drained and vented by the appropriate setting of condensate valves 32 and 33, steam isolation valves 38 and 41 and drain valves 48 and 49. In other words, each of the steam generators 18 and 28 is constructed so that its respective gas turbine can be operated with the steam generator in a dry condition.

The combined cycle plant 10 affords a high degree of reliability in that failure of any one of the major apparatus components will not reduce total plant power generation capacity by more than 50%. In this regard and by way of example only, a combined cycle plant 10 has been developed having a nominal maximum power generating capacity of 260 megawatts. In such plant, each of the gas turbines 12 and 22 is capable of producing a maximum of approximately 80 megawatts of electrical power under ISO conditions (50° Fahrenheit at sea level) and the steam turbine 36 is capable of producing a maximum of approximately 100 megawatts of electrical power. Thus, loss of any one of the turbines 12, 22 and 36, for example, would not reduce total plant capacity by as much as 50%.

It is noted in passing that the functional block diagram of FIG. 1 has been simplified in some respects relative to the actual plant apparatus to be described hereinafter, this simplification being made to facilitate an initial overall understanding of the combined cycle plant 10. A major simplification in FIG. 1 concerns the fuel valves 14, 19, 24, and 29. As will be seen in the actual embodiment of the combined cycle plant described herein, provision is made for operating the gas turbines 12 and 22 and the afterburners 16 and 26 on either of two different kinds of fuel, namely, either natural gas or distillate type fuel oil. As a consequence, each of the gas turbines 12 and 22 and each of the afterburners 16 and 26 is actually provided with two fuel throttle valves, one for natural gas and the other for fuel oil. Also, various other valves and devices employed in the actual fuel supply systems have been omitted from FIG. 1 for the sake of simplicity. Other simplifications employed in FIG. 1 are of a similar character.

Figure 2:
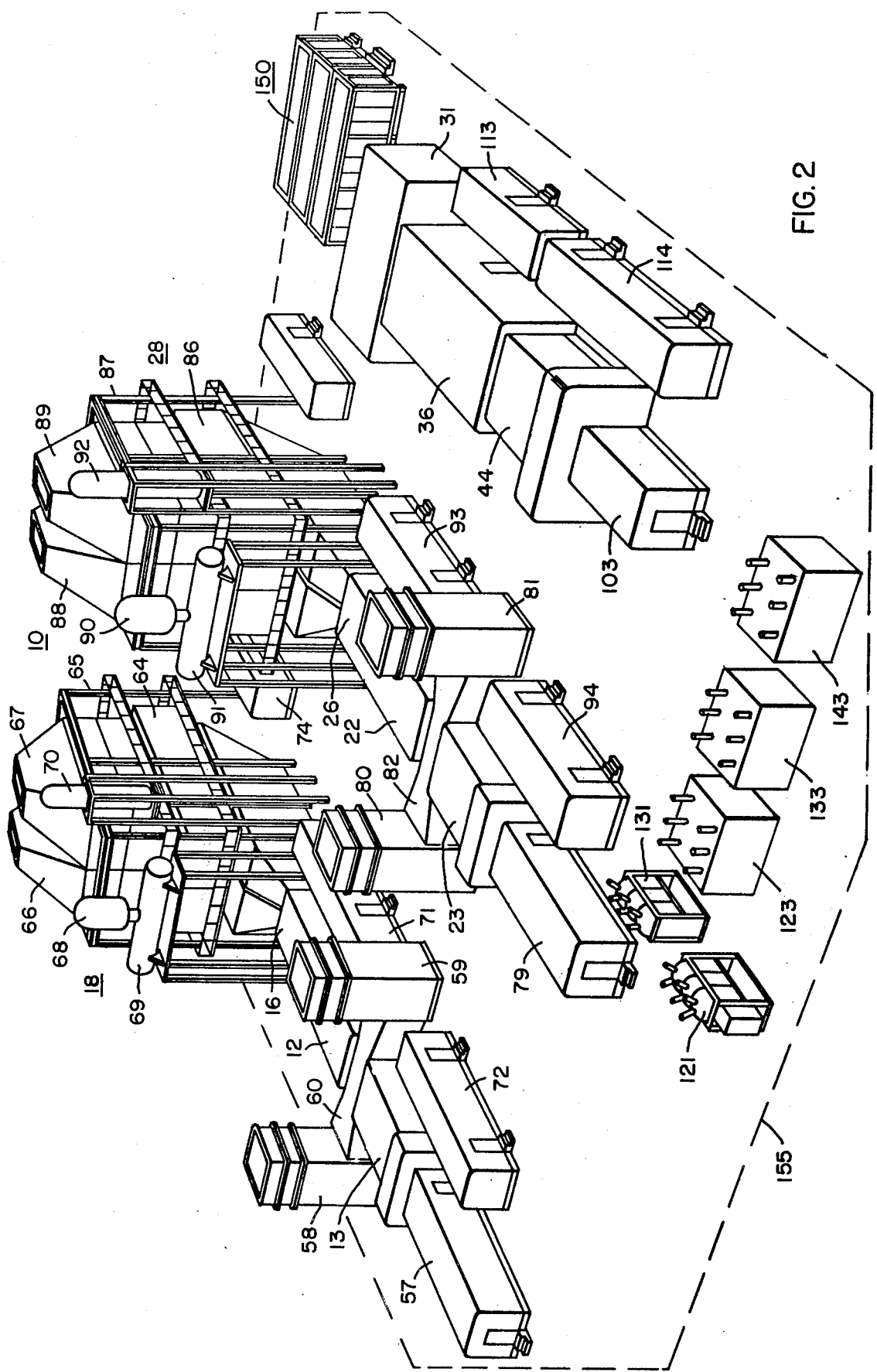
FIGS. 2 and 3 are, respectively, a perspective and top plan view of the arrangement of the combined cycle electric power plant as shown in FIG. 1.
Figure 3:
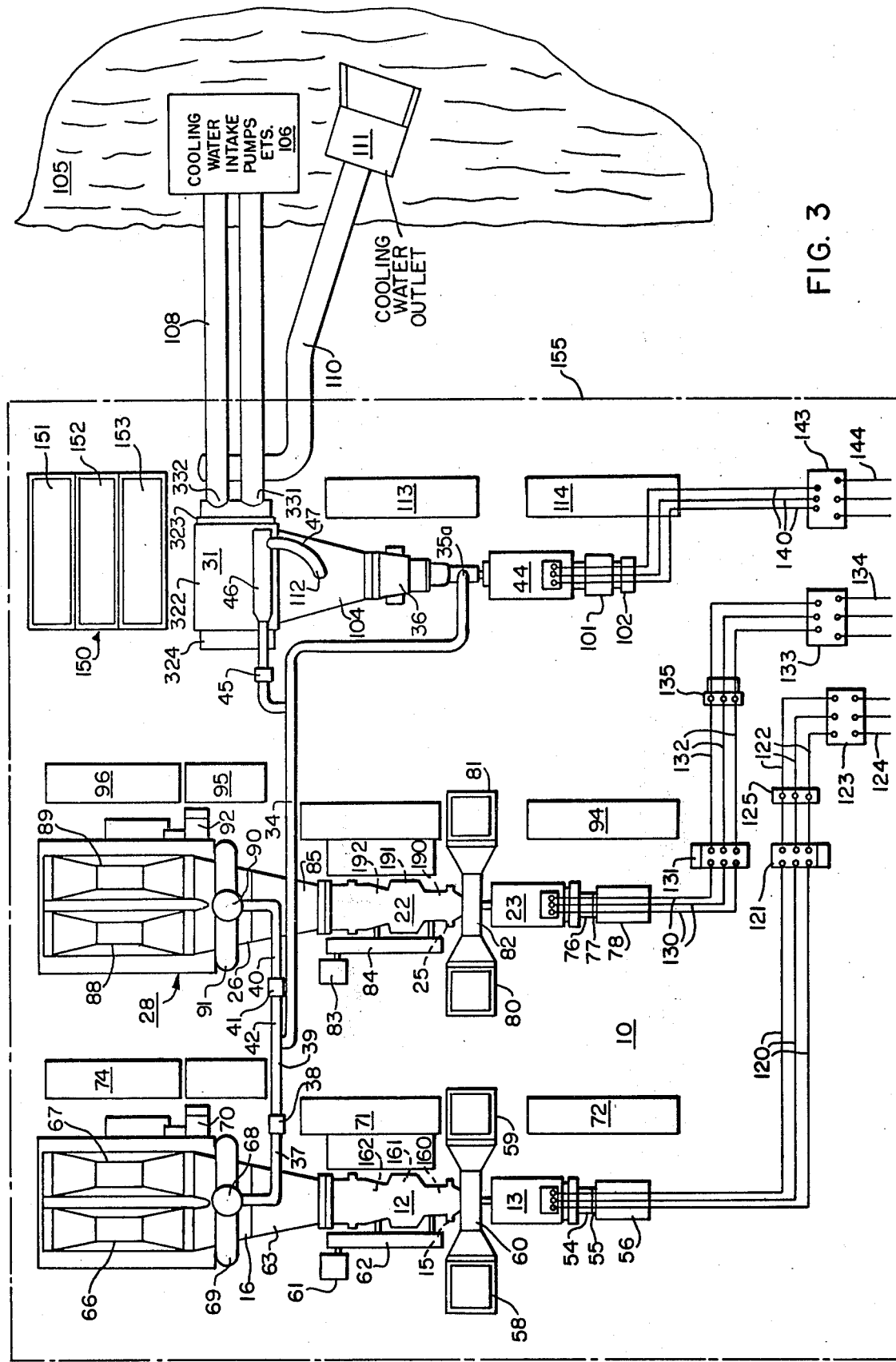

Referring now to FIGS. 2 and 3, there is shown the physical layout and overall structural nature of the apparatus included in the combined cycle electric power generating plant 10. FIG. 2 is a perspective view of the plant 10 and FIG. 3 is a plan view of the plant 10. FIG. 3 is somewhat more detailed and shows some additional structures not shown in FIG. 2. Thus, in the following description, reference will more frequently be had to FIG. 3.

As indicated in FIG. 3, the electric generator 13 is located in line with the gas turbine 12, the rotary shaft of the generator 13 being connected in tandem with the rotary shaft of the gas turbine 12. Also connected in tandem with the generator 13 on the end opposite turbine 12 is an exciter unit 54, a disengaging coupler or clutch mechanism 55 and an electric starting motor 56. Units 54–56 are located inside the enclosure 57 shown in FIG. 2. In the present embodiment, the electric generator 13 is of the three-phase alternating-current hydrogen-cooled type and is capable of generating better than 80 megawatts of electrical power at a voltage of 13.8 kilovolts. The rated speed of generator 13 is 3,600 rpm.

The physical structure associated with the gas turbine 12 includes a pair of vertically extending air intake ducts 58 and 59 which are open at the top and which communicate at their lower ends with a horizontal air intake duct 60. The duct 60, in turn, communicates with the air intake end of the compressor section of the gas turbine 12. In geographical locations having high ambient temperatures, evaporative coolers (not shown) are located in the vertical air intake ducts 58 and 59. The inlet guide vane mechanism 15 is located in the opening at the inlet end of the compressor section of the gas turbine 12. An air-to-air heat exchanger or air cooler 61 is located alongside of the gas turbine 12 and serves to cool some air which is extracted from an intermediate stage of the gas turbine compressor and then returned to the turbine section for purposes of cooling some of the turbine blades. Air cooler 61 is coupled to the gas turbine 12 by way of cooling pipes located in an enclosure 62.

The exhaust end of the gas turbine 12 is connected by way of duct work 63 to the afterburner unit 16 which is, in turn, coupled to the intake or inlet opening of the No. 1 heat recovery steam generator 18. The steam generator 18 includes a stack structure 64 (FIG. 2) having a heavy outer steel casing, such stack structure 64 being tied to and supported by a structural steel framework 65 (FIG. 2). Located at the top of the stack structure 64 are a pair of exhaust sections 66 and 67 which serve to exhaust into the atmosphere the hot gas supplied to the steam generator 18 by the gas turbine 12. The steam generator 18 further includes a deaerator unit 68, a low pressure feed-water storage tank 69 and a vertical high pressure steam drum 70. The overall height of the steam generator 18 is approximately 52 feet or some 5 stories.

Located alongside of the gas turbine 12, the electric generator 13 and the steam generator 18 are a number of auxiliary equipment enclosures 71, 72, 73 and 74. For simplicity of illustration, enclosure 73 is not shown in FIG. 2. Enclosure 71 is a gas turbine mechanical auxiliary equipment enclosure which houses, among other things, the fuel valves, fuel pumps, pressure regulators and the like for the fuel system which supplies the fuel to the gas turbine 12, the lube oil and seal oil equipment for the gas turbine 12 and various control system components such as actuators, control relays, sensors, signal transmitters and the like used in connection with the foregoing mentioned and other mechanisms associated with the gas turbine 12.

Enclosure 72 is a gas turbine and generator auxiliary equipment enclosure which, among other things, houses a motor control center for the gas turbine 12 and generator 13, a bank of storage batteries for providing emergency auxiliary power, a battery charger system for the storage batteries, hydrogen cooling equipment for the generator 13, lube and seal oil equipment for the generator 13 and various control system components such as actuators, control relays, sensors, signal transmitters and the like used in connection with the foregoing mentioned and other mechanisms associated with the gas turbine 12 and generator 13.

Enclosure 73 (FIG. 3) is an afterburner auxiliary equipment enclosure which, among other things, houses the fuel valves for the afterburner 16. Enclosure 74 is a steam generator auxiliary equipment enclosure which, among other things, houses a main boiler feed pump, a standby boiler feed pump, a chemical treatment system including storage tanks and pumps for phosphate, hydrazine and amine, a motor control center and various motors, valves and heater controls associated with the steam generator 18 and various control system components such as actuators, control relays, sensors, signal transmitters and the like used in connection with the foregoing mentioned and other mechanisms associated with the steam generator 18.

The second electric generator 23 is located in line with the second gas turbine 22, the rotary shaft of the generator 23 being connected in tandem with the rotary shaft of the gas turbine 22. Connected in tandem with the generator 31 at the opposite end thereof is an exciter unit 76, a disengaging coupler or clutch mechanism 77 and an electric starting motor 78. Units 76–78 are located in the enclosure 79 shown in FIG. 2. Electric generator 23 is of the three-phase alternating-current hydrogen-cooled type and is capable of generating in excess of 80 megawatts of electrical power at a voltage of 13.8 kilovolts. The rated speed of generator 23 is 3,600 rpm.

The structure associated with the second gas turbine 22 includes a pair of vertical air intake ducts 80 and 81 which are open at the top and which communicates at the bottom with a horizontal air intake duct 82. Duct 82, in turn, communicates with the intake opening of the compressor section of the gas turbine 22. Air cooler 83 and cooling pipes in enclosure 84 serve to cool some air which is extracted from the compressor section of gas turbine 22 and is used to cool some of the blades in the turbine section of the gas turbine 22. The exhaust end of gas turbine 22 is coupled by way of a duct work 85 and the No. 2 afterburner unit 26 to the inlet opening of the No. 2 heat recovery steam generator 28.

The second steam generator 28 is of the same construction as the first steam generator 18 and, as such, includes a stack structure 86 (FIG. 2) having a heavy outer steel casing which is tied to and supported by a structural steel framework 87 (FIG. 2). Located at the top of the stack structure 86 are a pair of exhaust sections 88 and 89 which are open at the top. Steam generator 28 further includse deaerator unit 90, a low pressure feedwater storage tank 91 and a vertical high pressure steam drum 92.

Located alongside of the gas turbine 22, electric generator 23 and steam generator 28 are a gas turbine mechanical auxiliary equipment enclosure 93, a gas turbine and generator auxiliary equipment enclosure 94, an after-burner auxiliary equipment enclosure 95 (not shown in FIG. 2) and a steam generator auxiliary equipment enclosure 96. These auxiliary equipment enclosures 93–96 include the same kinds of equipment as is included in the auxiliary equipment enclosures 71–74, respectively. The equipment, mechanisms and components housed in enclosures 93–96 are used in connection with the operation of gas turbine 22, electric generator 23, afterburner 26 and steam generator 28 in the same manner that the corresponding auxiliary equipment in enclosures 71–74 is used in connection with the operation of gas turbine 12, electric generator 13, afterburner 16 and steam generator 18.

Considering now the steam turbine 36 and its associated electric generator 44, these units are, as indicated in FIG. 3, located in line with one another, the rotary shaft of the generator 44 being connected in tandem with the rotary shaft of the steam turbine 36. Coupled in tandem at the opposite end of the generator 44 is an exciter unit 101 and a turning gear 102. Units 101 and 102 are located in the enclosure 103 shown in FIG. 2. Electric generator 44 is of the three-phase alternating-current hydrogen-cooled type and is capable of generating in excess of 100 megawatts of electrical power at a voltage of 13.8 kilovolts. The rated speed of generator 44 is 3,600 rpm.

Steam turbine 36 receives superheated steam from the two steam generators 18 and 28 by way of steam pipes 34, 37, 39, 40 and 42. The exhaust end of the steam turbine 36 is connected by way of duct work 104 to the steam inlet of the condenser 31. The resulting condensed steam or condensate is collected in a hotwell (not shown) located below the condenser 31, from whence it is pumped back to the steam generators 18 and 28 by way of condensate piping which, for sake of clarity, is not shown in FIGS. 2 and 3.

Cooling water or circulating water for the condenser 31 is obtained from a nearby body of water 105, such as a river or lake or the like, at which is located a water intake station 106. Water intake station 106 includes appropriate circulating water pumps, cooling water pumps, traveling screens, trash racks, strainers, and the like for obtaining the water needed by the condenser 31 as well as the water needed by an auxiliary cooling water system to be described hereinafter. The water intake station 106 pumps circulating water by way of pipes 107 and 108 to the condenser 31 which, as will be seen, is of the divided water box type. Incoming water flowing by way of pipe 108 passes through one set of condenser tubes in the condenser 31 and is returned by way of a discharge pipe 110 and a water outlet station 111 to the body of water 105. Water flowing to the condenser 31 by way of the pipe 107 passes through a second set of condenser tubes in the condenser 31 and is returned to the body of water 105 by way of the discharge pipe 110 and the water outlet station 111. Where the body of water 105 is a river, the outlet station 111 is located on the downstream side of the intake station 106.

As is seen in FIG. 3, the desuperheater 46 in the steam bypass path is located above the condenser 31, the discharge end of the desuperheater 46 being connected by way of pipe 47 to a bypass inlet 112 in the duct work 104.

Located alongside of the steam turbine 36 is a steam turbine mechanical auxiliary equipment enclosure 113 which, among other things, houses a hydraulic system for the steam turbine valves, a lube oil system for the steam turbine 36 including a lube oil cooler and controller, a gland steam condenser, air ejector apparatus for the condenser 31 and various control system components such as actuators, control relays, sensors, signals transmitters and the like used in connection with the steam turbine 36 and the condenser 31. Located alongside of the electric generator 44 is a steam turbine and generator auxiliary equipment enclosure 114 which, among other things, houses a motor control center for the steam turbine 36 and generator 44, a bank of storage batteries for providing emergency auxiliary power, a battery charging system for the storage batteries, hydrogen cooling equipment for the generator 44, seal oil equipment for the steam turbine 36 and generator 44 and various control system components such as actuators, control relays, sensors, signal transmitters and the like used in connection with the foregoing mentioned and other mechanisms associated with the steam turbine 36, generator 44 and condenser 31.

Three-phase alternating-current electrical power is taken from the armature windings of the three-phase alternating-current generator 13 by means of power conductors 120 which run to oil-type circuit breakers 121. The output sides of circuit breakers 121 are connected by power conductors 122 to the primary windings of a three-phase main power transformer 123. The secondary windings of the main power transformer 123 are connected by means of power conductors 124 to an adjacent high-voltage transmission substation (not shown) of the electric utility system which receives the electricity generated by the electric power generating plant 10. An auxiliary transformer 125 is connected to the power conductors 122 and is used to tap off some of the electrical power produced by the generator 13 for use in operating the various electrical equipment and apparatus included in the plant 10.

Three-phase alternating-current power is taken from the armature windings of the second three-phase alternating-current generator 23 by means of power conductors 130 which run to oil-type circuit breakers 131. The output sides of circuit breakers 131 are connected by power conductors 132 to the primary windings of a second three-phase main power transformer 133. The secondary windings of the main power transformer 133 are connected by means of power conductors 134 to the adjacent high-voltage transmission substation (not shown) of the electric utility system which receives the power generated by the combined cycle plant 10. An auxiliary transformer 135 is connected to the power conductors 132 and is used to tap off some of the electrical power produced by the generator 23 for use in energizing the various electrical equipment and apparatus included in the plant 10.

Three-phase alternating-current power is taken from the armature windings of the third three-phase alternating-current generator 44 by means of power conductors 140 which run to the primary windings of a third three-phase main power transformer 143. The secondary windings of the main power transformer 143 are connected by means of power conductors 144 to the adjacent high-voltage transmission substation of the electric utility system which receives the power from the plant 10.

The adjacent high-voltage transmission substation (not shown) which is connected to the secondary windings of the three main power transformers 123, 133 and 143 via conductors 124, 134 and 144 is, in turn, connected to the electric power transmission system which is used to carry the electrical power generated by the plant 10 to the various industrial, commercial and residential customers of the electric utility system. By way of example only, the magnitude of the voltage generated by each of the generators 13, 23, and 44 may have a value of, for example, 13.8 kilovolts and the magnitude of the voltage appearing across the secondary windings of each of the main power transformers 123, 133 and 143 may have a value of, for example, 230 kilovolts.

B. Heat Recovery Steam Generator Mechanical Structure

Figure 4:
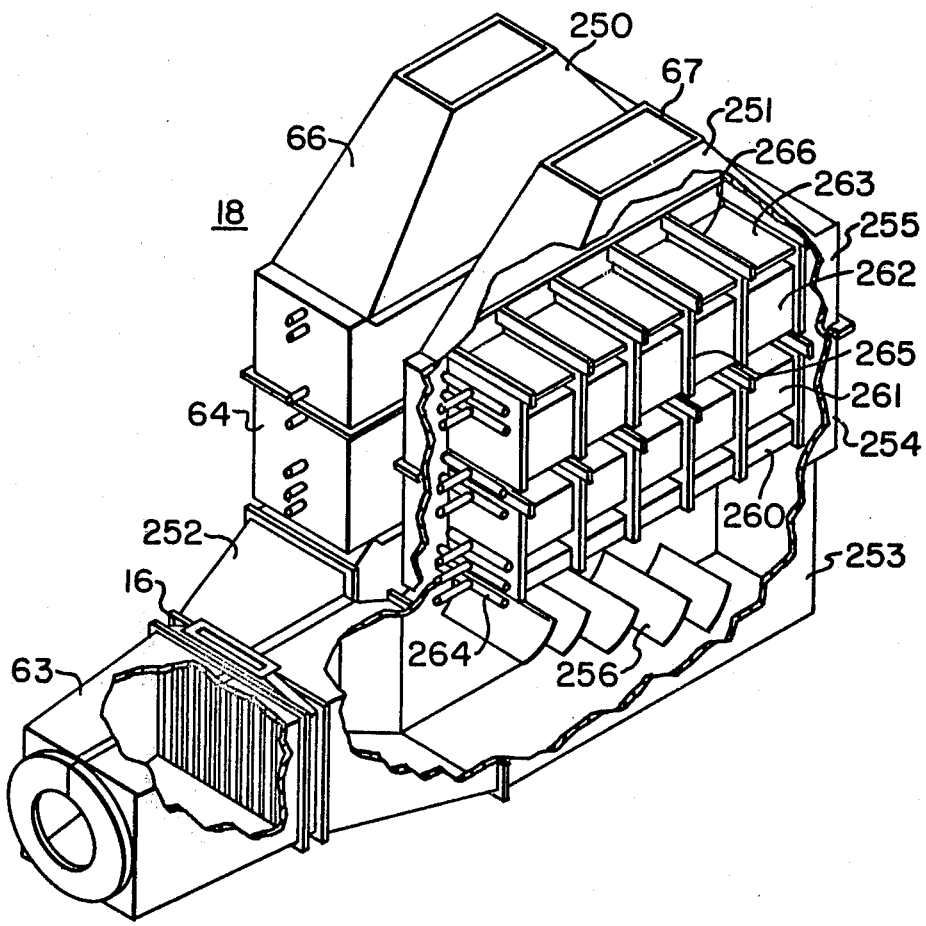
FIG. 4 shows a perspective view of a heat recovery steam generator as incorporated into the combined cycle electric power plant of FIG. 1.

Referring now to FIG. 4, there is shown in greater detail the manner of construction of the first heat recovery steam generator 18. FIG. 4 is a partially broken away perspective view of the main body portion or stack structure 64 of the steam generator 18. As there seen, the stack structure 64 is split into two separate parallel structures 250 and 251, this being done to facilitate shop assembly and transportability to the plant site. A Y shaped diffuser duct 252 directs the hot gas from the afterburner 16 into the lower portions of each of the stack structures 250 and 251. Each of the stack structures 250 and 251 includes a turning vane module 253, a lower tube module 254, an upper tube module 255 and an exhaust transition section, the exhaust transition section for the stack structure 250 being item 66 and that for the stack structure 251 being item 67.

Located in each of the two turning vane modules 253 is a number of curved turning vanes 256 which serve to turn the hot gas flow upwardly through the remainder of the stack structure. Located inside each of the lower tube modules 254 are two separate sets or bundles of boiler tubes 260 and 261, the lower set 260 being a superheater section and the higher set 261 being a high-pressure evaporator section. The upper tube module 255 also includes two bundles or sets of boiler tubes 262 and 263, the lower set 262 being an economizer section and the upper set 263 being a low-pressure evaporator section. A typical one of the various headers for the tube sets is indicated at 264, this being the outlet header for the superheater section 260.

The tubes in all four sections 260–263 are of the serrated fin type wherein the fin is in the form of a slotted metal strip which is continuously welded to the tube. The tubes in the superheater and high-pressure evaporator sections 260 and 261 are approximately two inches in diameter, while the tubes in the economizer and low-pressure evaporator sections 262 and 263 are approximately 1.5 inches in diameter. The tubes and tube fins in the high-pressure evaporator section 261, the economizer section 262 and the low-pressure evaporator section 263 are made of carbon steel, while the tubes and tube fins in the superheater section 260 are made of chromium stainless steel. All the tubes in each of the modules 254 and 255 are supported in interlocking tube supports 265. These tube supports 265 are hung from carbon steel I-beams 266 located across the top of each of the modules 254 and 255. These I-beams 266 protrude through the module walls and are bolted to the structural steel framework 65 (FIG. 2) during plant erection.

The hot exhaust gas from the gas turbine 12 passes through the afterburner 16, is turned upwardly by the turning vanes 256 and passes through the various tube bundles 260–263. During this passage, the steam and water in the various tubes absorbs most of the heat from the turbine exhaust gas. The turbine exhaust gas is thereafter exhausted to the atmosphere by way of the exhaust transition sections 66 and 67. The temperature of the hot gas leaving the afterburner 16 and entering the steam generator 18 may, under peak load conditions, be as high as 1200° Fahrenheit, in which case, the temperature of the gas exhausted to the atmosphere by way of exhaust sections 66 and 67 will, under normal operating conditions, be on the order of approximately 340° Fahrenheit.

The exhaust openings at the tops of the transition sections 66 and 67 are provided with stack covers (not shown) having adjustable louvers which may be closed when the steam generator 18 is not in use. The diffuser duct 252 and the outer shell of each of the modules 253, 254 and 255 and the exhaust transition sections 66 and 67 are constructed of carbon steel and are internally lined with insulation material made of hydrous calcium silicate bonded with asbestos fibers. This insulation material is covered with metal lagging to prevent erosion.

A primary purpose of the turning vanes 256 is to provide a uniform distribution of gas flow through the tube bundles 260–263 and to dissipate hot spots in the gas steam caused by the afterburner 16. A further advantage is to produce an arrangement where the superheater tubes 260 absorb almost no heat by direct radiation. This latter feature enables superheater performance and tube metal temperatures to be more accurately controlled.

The construction of the steam generator 18 is such that it can be drained and vented without shutting down the gas turbine 12 and operated dry for extended periods of time with no adverse effect on the equipment. The steam generator 18, like other components in the combined cycle plant 10, is prepackaged and shipped to the plant site as factory assembled modules. In other words, each of the modules 253, 254 and 255, as well as the diffuser duct 252 and the exhaust sections 66 and 67, are completely preassembled at the factory and are individually shipped by rail or the like to the plant erection site. These various modules and sections are then bolted or welded together at the plant site to provide the complete steam generator structure. This modular approach considerably reduces the overall cost of the steam generator and holds the field erection work to a minimum.

The second heat recovery steam generator 28 is of the same construction as shown in FIG. 4 for the first heat recovery steam generator 18.

C. Detailed Plant Description

Referring now to FIGS. 5G and 5A–5F, FIG. 5G is a key diagram showing the manner in which FIGS. 5A–5F are to be arranged to form a complete view. FIGS. 5A–5F, when arranged in the manner indicated in FIG. 5G, constitute a detailed flow or piping and instrumentation diagram for the combined cycle electric power generating plant 10 of FIG. 3. As such, FIGS. 5A–5F show in greater detail the various valves, pumps, measurement devices and other items associated with the heat recovery steam generators 18 and 28, the condenser 31 and the steam turbine 36, as well as the various fluid pipes and lines which interconnect these units and their associated items. FIGS. 5A–5F also show in considerable detail the piping, valves, pumps and so forth for the fuel systems for the gas turbines 12 and 22 and the afterburners 16 and 26. At times herein, the composite figure formed by FIGS. 5A–5F will simply be referred to as FIG. 5G.

The same reference numerals used in the earlier figures will be used in FIGS. 5A–5F for elements previously described in these earlier figures. In some cases, an item previously described as a single element will be described in FIGS. 5A–5F as two or more identical elements performing the same function, usually in parallel with one another. In such cases, the same reference numeral will be used but with suffix letters $a$, $b$, $c$, etc. added thereto to distinguish the different ones of the identical multiple elements. For example, there is shown in FIG. 1 a single condensate pump 30 whereas, in FIG. 5B, there is shown a pair of condensate pumps 30a and 30b. During normal operation, the two pumps 30a and 30b are equivalent to the single pump 30.

Figure 5A:
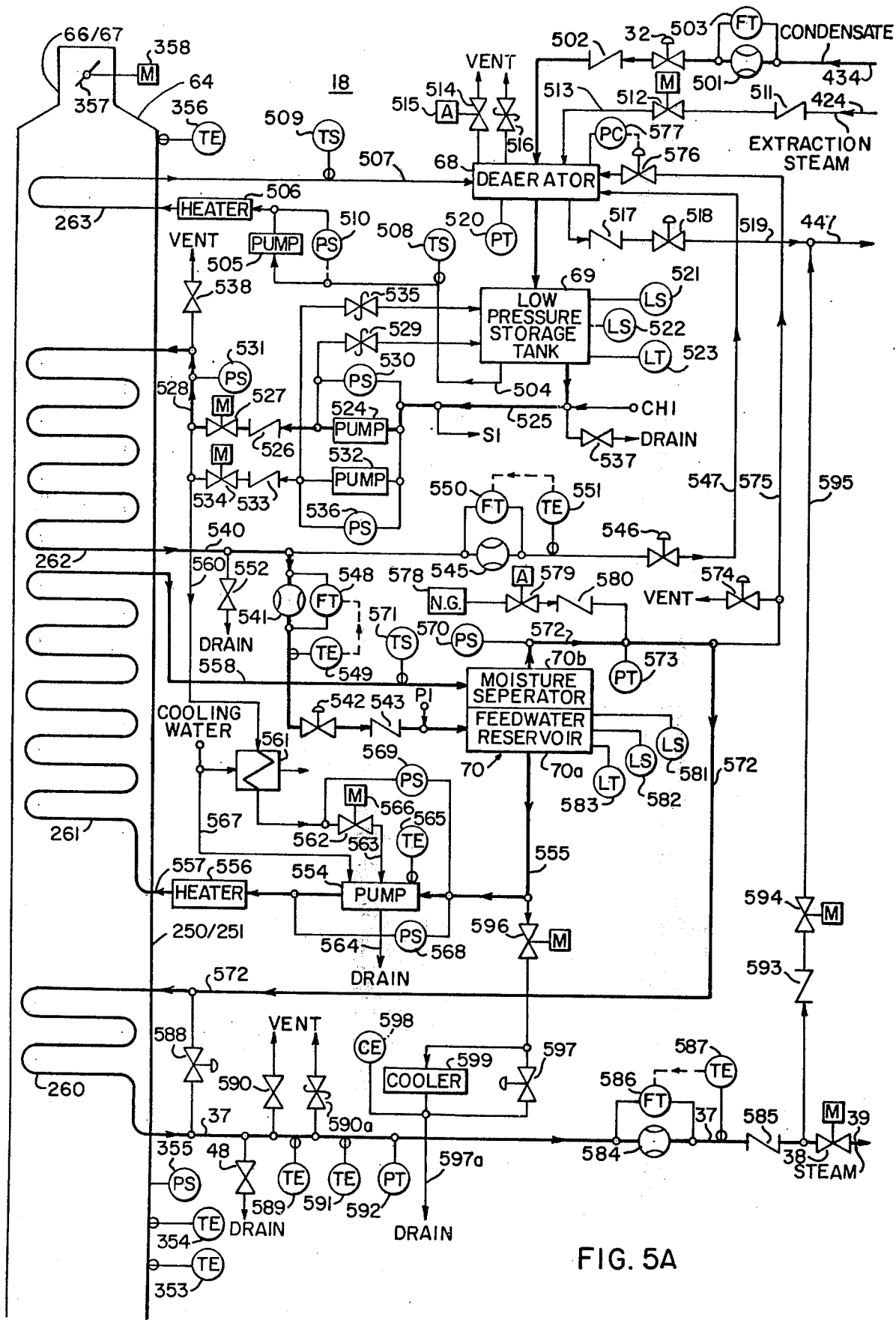

In other instances, items shown as multiple elements in earlier figures will, for simplicity of illustration, be shown as single elements in FIGS. 5A–5F. For example, in FIG. 4, the stack structure 64 of the first steam generator 18 is shown as being comprised of a pair of parallel stack structures 250 and 251. In FIG. 5A, only a single stack structure 64 is shown, it being understood that this single structure in FIG. 5A represents, in a schematic manner, the two parallel structures 250 and 251 of FIG. 4. Thus, the superheater tubes 260 shown in FIG. 5A comprise and include the superheater tubes 260 in both of the parallel stack structures 250 and 251. The superheater tubes 260 in the two structures 250 and 251 are, in fact, operated in parallel to function, from a process flow standpoint, as a single set of tubes. This same consideration applies to the other tube sets 261, 262 and 263 included in the stack structures 250 and 251 of FIG. 4.

Various elements in FIGS. 5A–5F are identified by letter symbols. The meanings of these letter symbols are set forth in the following table:

| LETTER SYMBOL | ELEMENT DESCRIPTION |
|---|---|
| A | Actuator |
| C | Clutch |
| CC | Conductivity Controller |
| CE | Conductivity Element |
| CT | Conductivity Transmitter |
| E | Exciter |
| F | Filter |
| FC | Flow Controller |
| FE | Flow Element |
| FT | Flow Transmitter |
| LC | Level Controller |
| LS | Level Switch |
| LT | Level Transmitter |
| M | Motor |
| NG | Nitrogen Gas Supply |
| PC | Pressure Controller |
| PS | Pressure Switch |
| PT | Pressure Transmitter |
| S | Speed Transducer |
| TC | Temperature Controller |
| TE | Temperature Element |
| TG | Turning Gear |
| TS | Temperature Switch |
| TT | Temperature Transmitter |

The various conductivity elements (CE), conductivity transmitters (CT), flow transmitters (FT), level switches (LS), level transmitters (LT), pressure switches (PS), pressure transmitters (PT), speed transducers (S), temperature elements (TE), temperature switches (TS) and temperature transmitters (TT) shown in FIG. 5G develop various electrical signals which provide measurements of various parameters and which, in most cases, are transmitted to the digital and analog control system equipment located in the plant control center building 150 (FIG. 3) for turbine and plant control and monitoring purposes. The actuators (A), motors (M) and most of the valves shown in FIG. 5G, on the other hand, are responsive to and are controlled by control signals which, for the most part, are produced by the digital and analog control system equipment located in the plant control center building 150.

It is noted at this point that most of the valves shown in FIG. 5G are diaphragm valves of either the pneumatic of the hydraulic type. The pneumatic valves are actuated by pressurized air obtained from the plant instrument air supply. They are controlled, however, by electrical signals which are applied to electrical-to-pneumatic converters associated with the valve pneumatic mechanisms. Most of the valves associated with the heat recovery steam generators 18 and 28 and the gas turbines 12 and 22 are of the pneumatic type. On the other hand, most of the valves associated with the steam turbine 36 are hydraulic valves which are operated by electrohydraulic controls. In this case, the valve actuating fluid is high pressure oil with the hydraulic actuator mechanism being controlled by an electrical control signal. For simplicity of illustration and description, the pneumatic and hydraulic mechanisms will, for the most part, not be shown or described herein and the valves will be spoken of more or less as though they were being driven directly by the electrical control signals.

Reference is made to a printed technical paper entitled "Electro-Hydraulic Control For Improved Availability and Operation of Large Steam Turbines," presented by M. Birnbaum and E. G. Noyes at the ASME-IEEE National Power Conference at Albany, New York during Sept. 19–23, 1965, for further description of typical hydraulic valves and electrohydraulic actuators.

Considering now the No. 1 gas turbine 12 (FIG. 5D), there is associated therewith, in addition to the other elements previously considered, a turning gear 349 which is coupled to the rotary shaft structure 165 and which is used to rotate such gas turbine structure at a speed of approximately 5 rpm just prior to a gas turbine startup and during the cool down period following a gas turbine shutdown. A speed pick-up device or speed transducer 350 is also coupled to the rotary shaft structure 165 and produces an electrical signal indicative of the speed of rotation (rpm) of the gas turbine 12 and the electric generator 13. During normal operation under load conditions, the gas turbine speed will be the synchronous value of 3,600 rpm and, during startup, it will normally be a controlled value as the turbine is accelerated to synchronous speed. Further, there is coupled to the turbine combustor shell 166 which surrounds the 16 combustors 167a–167p a pressure transmitter 351 which produces an electrical signal indicative of the magnitude of the pressure within the combustor shell. There is located in the turbine section 162 in the gas flow path at a point immediately following the last row of turbine blades an array of 16 temperature sensors or temperature elements 352a which provide signals indicative of the gas turbine blade path temperature. There is also located in the exhaust duct 63 leading from the turbine section 162 to the afterburner 16 an array of 16 temperature sensors or temperature elements 352b which provide signals indicative of the gas turbine exhaust temperature. Under peak load conditions, this exhaust temperature will be somewhere on the order of 900° to 1000° Fahrenheit.

As shown in FIG. 5A, there are located at the lower end of the stack structure 64 of the first steam generator 18 a plurality of temperature elements, including temperature elements 353 and 354, which provide indications of the steam generator inlet gas temperature. Under typical peak load conditions, this temperature will be on the order of approximately 1200° Fahrenheit as a result of added afterburner heat. A pressure switch 355 monitors the steam generator inlet gas pressure and produces a warning signal if such pressure exceeds a desired limit. Located at the top of the stack structure 64 is a further temperature element 356 which produces a signal indicative of the gas top temperature at the top of the stack. Under typical peak load conditions, this temperature will be approximately 340° Fahrenheit. Thus, under typical peak load conditions, the gas temperature varies from about 1200° Fahrenheit at the bottom the stack 64 (temperature element 353) to about 340° Fahrenheit at the top of the stack 64 (temperature element 356). The gas temperature intermediate the superheater tubes 260 and the high pressure evaporator tubes 261 is about 1000° Fahrenheit. The gas temperature intermediate the high pressure evaporator tubes 261 and the economizer tubes 262 is about 600° Fahrenheit. The gas temperature intermediate the economizer tubes 262 and the low pressure evaporator tubes 263 is about 360° Fahrenheit.

Located at the top of the stack structure 64 is a stack cover louver structure 357 which can be closed when the gas turbine 12 is not in service. This stack cover mechanism 357 is operated by a motor 358. In passing, it is noted that there are actually two of these stack cover mechanisms 357, one being located at the top of each of the two parallel stack structures 250 and 251 (FIG. 4).

Considering now the second heat recovery steam generator 28 (FIG. 5C), there is located within the stack structure 86 thereof superheater tubes 360, high pressure evaporator tubes 361, economizer tubes 362 and low pressure evaporator tubes 363. These tubes 360–363 correspond in purpose and function to the tubes 260–263, respectively, located in the stack structure 64 of the first steam generator 18. Located at the lower end of the second stack structure 86 (FIG. 5F) are turning vanes 366 which turn the turbine exhaust gas upwardly through the tube sections 360–363.

Figure 5B:
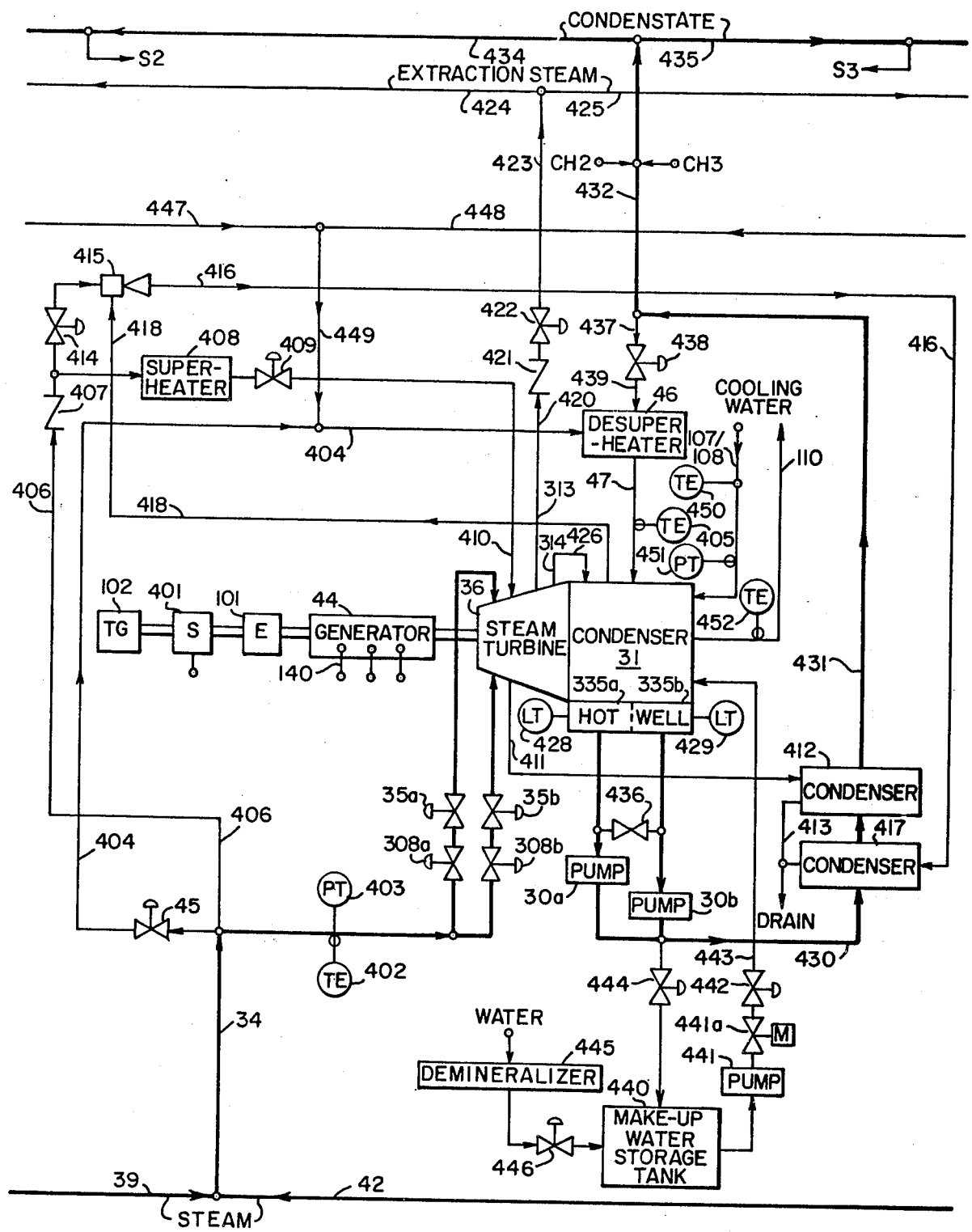
Figure 5C:
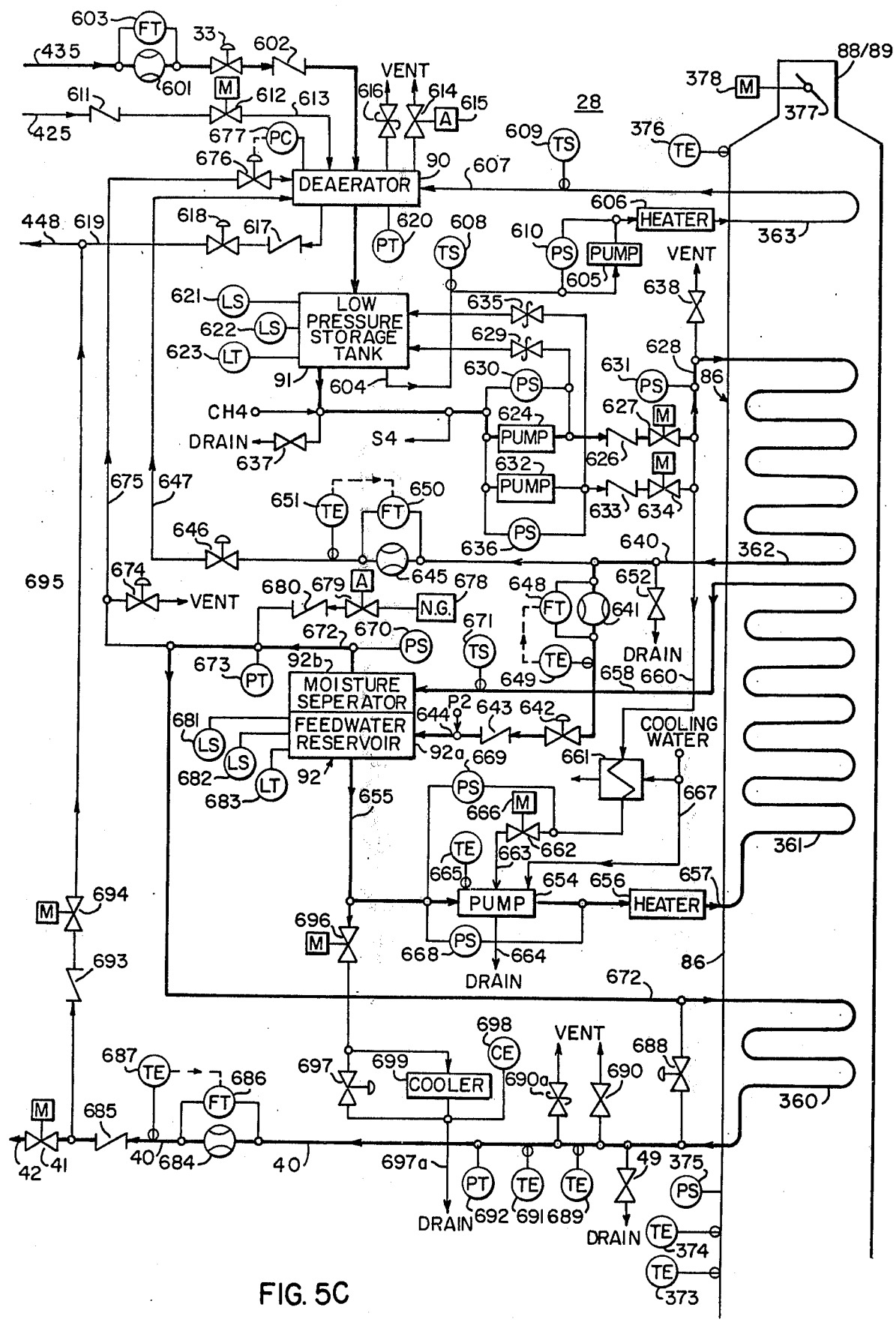
Figure 5D:
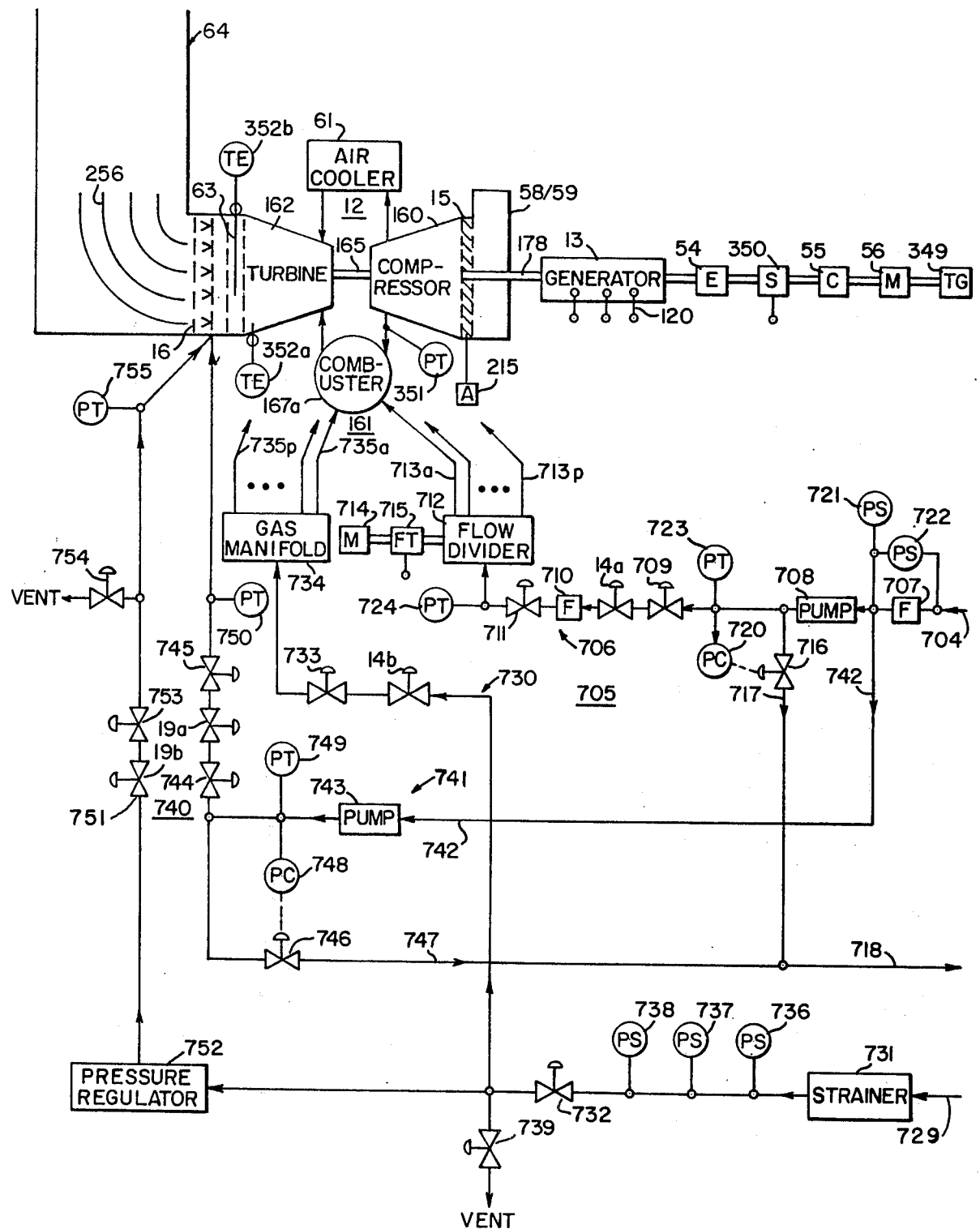
Figure 5F:
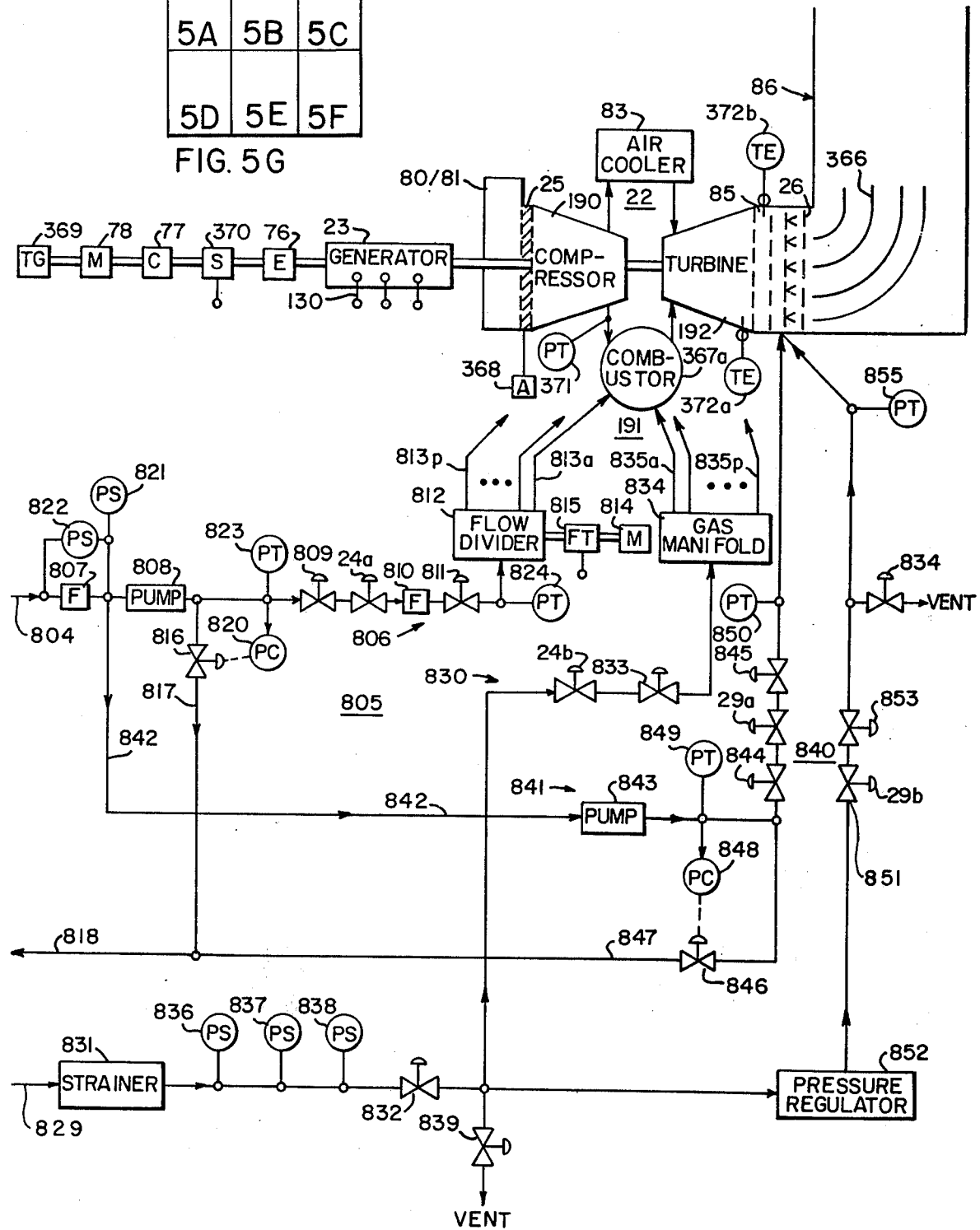

The combustion section 191 of the second gas turbine 22 (FIG. 5F) includes a concentric array of 16 combustors 367a–367p with only the combustor 367a being shown in FIG. 5F. The inlet guide vane mechanism 25 associated with the second gas turbine 22 is controlled by an actuator mechanism 368. A turning gear 369 is coupled to the rotary shaft structure of the electric generator 23 for turning the gas turbine rotor structure at a speed of approximately 200 rpm just prior to a gas turbine startup and during the cool down period following a gas turbine shutdown. A speed transducer 370 is coupled to the rotary shaft structure of the electric generator 23 and produces an electrical signal which indicates the speed of rotation or rpm of the rotary structures of generator 23 and gas turbine 22. A pressure transmitter 371 produces an electrical signal which indicates the magnitude of the pressure within the combustor shell which forms the outer housing of the gas turbine combustion section 191.

An array of 16 temperature elements 372a measure the blade path temperature at the outlet of the blade section in turbine portion 192 of the gas turbine 22. An array of 16 temperature elments 372b measure the exhaust gas temperature of the gas turbine 22. As shown in FIG. 5C, temperature elements 373 and 374 measure the inlet gas temperature for the stack structure 86, while a pressure switch 375 monitors the inlet gas pressure. A temperature element 376 measures the stack top gas temperature for the stack structure 86. Typical temperature values are the same as for the first stack structure 64. An adjustable louver type stack cover mechanism 377 is located at the top of the stack structure 86 (there being one of these mechanisms for each of the exhaust sections 88 and 89) and it is controlled by a motor 378.

Considering now the steam turbine 36, electric generator 44 and condenser 31 (FIG. 5B) in greater instrumentation detail, a speed transducer 401 is coupled to the rotary shaft structure of the generator 44 and produces an electrical signal indicating the rotary speed or rpm of the rotor structures of the steam turbine 36 and generator 44. Under normal load conditions, the steam turbine speed will be the synchronous value of 3,600 rpm and, during startup, the steam turbine speed will normally be a controlled value as the turbine accelerates to snychronous speed. A temperature element 402 and a pressure transmitter 403 generate electrical signals which indicate the throttle temperature and the throttle pressure of the steam entering the inlet of the steam turbine 36. Under typical peak load conditions, the turbine inlet steam temperature will be approximately 952° Fahrenheit and the turbine inlet steam pressure will be approximately 1,277 pounds per square inch (absolute). The outlet side of the steam turbine bypass valve 45 is connected to the desuperheater 46 by way of a steam pipe 404. A temperature element 405 generates an electrical signal which indicates the temperature of any steam flow from the desuperheater 46 to the condenser 31 by way of steam pipe 47. Under typical load conditions with both of the gas turbines 12 and 22 in operation, the bypass valve 45 is fully closed and no steam flows to the desuperheater 46.

Some of the steam in the incoming main steam pipe 34 is removed by way of a steam pipe 406 and supplied by way of a check valve 407, a superheater 408, a control valve 409 and a steam pipe 410 to the gland seals inside the steam turbine 36 to provide the desired sealing action therein. Superheater 408 is an electric heater having a rating of, for example, 45 kilowatts and is included in the steam turbine motor control center located in the auxiliary equipment enclosure 114 (FIG. 2). After passage through the gland seal structure, this gland steam is removed by way of a pipe 411 and passed to a gland steam condenser 412, the resulting condensate being passed to a drain tank (not shown) by way of a drain line 413.

Some of the steam in main steam line 34 is also supplied by way of a control valve 414 to an air ejector mechanism 415. Air ejector mechanism 415 is a Venturi type air ejector which is used to evacuate the condenser 31. The steam leaving the air ejector 415 passes by way of a steam line 416 to an air ejector steam condenser 417, the resulting condensate being passed to the drain line 413. Air is removed from the condenser 31 by way of a line 418 which runs to the air ejector 415. The Venturi effect occurring in the air ejector 415 serves to suck the air out of the condenser 31 by way of the air line 418. Under typical operating conditions, this evacuates the condenser 31 to a pressure of approximately two inches of mercury, Extraction steam for feedwater heating purposes is removed from the steam turbine 36 between the tenth and eleventh stages thereof by way of turbine outlet 313 and is supplied by way of a steam pipe 420, a check valve 421, a control valve 422 and steam pipe 423 to a pair of branch steam pipes 424 and 425. The branch steam pipe 424 supplies extraction steam to the deaerator 68 icluded in the first steam generator 18 (FIG. 5A), while the branch steam pipe 425 supplies extraction steam to the deaerator 90 included in the second steam generator 28 (FIG. 5C). The "internal water removal" steam removed between the 12th and 13th stages via the steam turbine outlet 314 is supplied by way of steam pipe 426 to the condenser 31. Level transmitters 428 and 429 produce electrical signals which indicate the water levels in hotwell portions 335a and 335b, respectively.

Condensate is pumped from the two hotwell portions 335a and 335b of the divided hotwell 335 by means of condensate pumps 30a and 30b, respectively. The inlet side of pump 30a is connected to the hotwell condensate outlet, while the inlet side of pump 30b is connected to the hotwell condensate outlet. The condensate pumped by pumps 30a and 30b is supplied by way of a condensate pipe 430, the air ejector steam condenser 417, the gland steam condenser 412, a condensate pipe 431 and a condensate pipe 432 to a pair of branch condensate pipes 434 and 435. Branch condensate pipe 434 runs to the deaerator 68 located in the first steam generator 18, while the second branch condensate pipe 435 runs to the deaerator 90 located in the second steam generator 28. The condensate as it leaves the pumps 30a and 30b is at a temperature of approximately 110° Fahrenheit. This condensate flows through the coolant tubes in the air ejector condenser 417 anb the gland steam condenser 412 to provide the cooling action which occurs in these condensers 417 and 412. A normally-open manual crossover valve 436 is connected between the two hotwell outlets and can be closed if half the condenser 31 is shut down for maintenance purpose or the like. Each of the condensate pumps 30a and 30b has sufficient capacity to enable either pump alone to carry the full flow load in the event the other pump should fail.

Some of the condensate flowing in the pipe 431 is also supplied by way of a pipe 437, a desuperheater control valve 438 and a pipe 439 to the desuperheater 46. This condensate provides the cooling medium in the desuperheater 46. The desuperheater 46 is of the water spray type such that the relatively cool condensate entering by way of pipe 439 is sprayed into the relatively hot steam flow entering by way of the pipe 404. Under typical conditions for such steam flow, this lowers the steam temperature to about 350° Fahrenheit. The temperature signal produced by the temperature element 405 coupled to the desuperheater outlet pipe 47 is supplied by way of a temperature transmitter (not shown) and a temperature controller (not shown) to the desuperheater control valve 438 for purposes of regulating same to hold the temperature of the desuperheater outlet steam in pipe 47 fairly constant.

If the condensate level in the hotwell portions 335a and 335b becomes too low, than makeup water from a makeup water storage tank 440 is supplied to the hotwell portions 335a and 335b by means of a makeup water pump 441, a makeup block valve 441a, a makeup control valve 442 and a makeup water pipe 443 which runs to the makeup water inlet 340 on the condenser 31. Conversely, if the condensate level in hotwells 335a and 335b becomes too high, then condensate is returned to the makeup water storage tank 440 by way of a condensate return valve 444. In other words, the pump 441 is operated and the valves 442 and 444 are opened and closed as needed in order to hold the condensate level in hotwells 335a and 335b fairly constant. This is accomplished by means of level sensing switches (not shown) associated with the hotwells 335a and 335b which operate the appropriate control circuits (not shown) to control the pump 441 and the valves 442 and 444. Block valve 441a is fully open during normal operation. When needed, additional water is supplied to the makeup water storage tank 440 from an external water source by way of a demineralizer 445 and a control valve 446.

A pair of auxiliary steam bypass lines 447 and 448 are connected by way of a common bypass line 449 to the bypass steam pipe 404 which runs to the desuperheater 46. Bypass line 447 enables steam from the first steam generator 18 (FIG. 5A) to be passed directly to the desuperheater 46 under certain operating conditions, while the bypass line 448 does likewise for the second steam generator 28 (FIG. 5C).

As previously indicated in connection with FIG. 3, cooling water or circulating water is taken from the river or lake 105 (FIG. 3) and supplied to the condenser tubes in the condenser 31 by way of circulating water intake pipes 107 and 108. Circulating water pumps located at the intake station 106 (FIG. 3) serves to move the water through the intake pipes 107 and 108. Temperature elements 450 and pressure transmitters 451 generate electrical signals which serve to monitor the temperature and pressure of the incoming circulating water. The circulating water leaves the condenser 31 by way of the outlet pipe 110 and is returned to the river or lake 105. A further temperature element 452 generates an electrical signal to monitor the temperature of the outgoing circulating water.

Various additional temperature elements, pressure transmitters, level transmitters and other measurement devices are associated with the condenser 31 and the steam turbine 36, these items being omitted from FIG. 5B for sake of simplicity.

Considering now the details of the first heat recovery steam generator 18 (FIG. 5A), condensate from the condenser hotwells 335a and 335b is supplied to the deaerator 68 by way of the condensate pipe 434, a flow element 501, the condensate control valve 32 (Cf. FIG. 1) and a check valve 502. A flow transmitter 503 cooperates with the flow element 501 to provide an electrical signal which indicates the value of the condensate flow rate through the flow element 501. Flow element 501 provides a restriction in the flow path and flow transmitter 503 measures the pressure difference across the restriction. As is well known, this pressure difference is indicative of the flow rate. Thus, flow element 501 and flow transmitter 503 constitute a well-known type of flowmeter for measuring fluid flow.

Deaerator 68 provides a feedwater hearing action as well as a deaerating action, and it is of the spray tray or jet tray type. The condensate entering from check valve 502 is sprayed by way of spray nozzles into a tray structure which also receives steam from the low pressure evaporator tubes 263. More particularly, the water or condensate collected in the deaerator 68 flows to a low pressure feedwater storage tank 69 which, among other things, serves as a storage reservoir for the deaerator 68. Water from this storage tank 69 flows by way of a pipe 504, a low pressure circulation pump 505, a standby electric heater 506, the low pressure evaporator tubes 263 and a pipe 507 to a steam inlet into the tray structure inside the deaerator 68. Low pressure circulation pump 505 provides the desired fluid flow and the low pressure evaporator tubes 263 in the stack structure 64 serve to convert the water into steam. This steam is supplied to the deaerator 68 by way of pipe 507 to heat the condensate entering the deaerator 68 from check valve 502. This provides a substantial portion of the desired feedwater heating.

Electric heater 506 is used for standby heating purposes when the gas turbine 12 is not in service. If the gas turbine 12 is not in operation and if it is desired to maintain the steam generator 18 in a hot standby condition, then the heater 506 is controlled by a temperature switch 508 so as to maintain the temperature of the water in the storage tank 69 at a value of approximately 250° Fahrenheit. If, on the other hand, it is desired that the steam generator 18 be shut down for an extended period of time but not drained, then electric heater 506 is used to provide freeze protection. In this latter case, the heater 506 is controlled by a temperature switch 509 so as to prevent the temperature of the water in this part of the system from falling below a value of 40° Fahrenheit. In both of these cases, the low pressure circulation pump 505 must be turned on and operating. A pressure switch 510 monitors the operation of the pump 505 and produces a warning signal if the pressure differential across the pump 505 becomes too low.

For total plant loads above approximately 80% of the total plant capacity, supplemental feedwater heating is provided by the extraction steam taken from the steam turbine 36. This extraction steam is supplied to the deaerator 68 by way of the extraction steam pipe 424, a check valve 511, a motor operated isolation valve 512 and a steam pipe 513. The extraction steam control valve 422 is opened for plant loads above the 80% figure. Below this figure, the steam used for feedwater heating is obtained from the low pressure evaporator tubes 263 and the economizer recirculation flow.

Deaerator 68 is provided with a low pressure vent valve 514 which is controlled by an actuator 515. Actuator 515 is of the solenoid type and is controlled by an appropriate control signal from the main operator control board in the plant control center building 150 (FIG. 3). During normal operation, the vent valve 514 is kept fully open to allow air to escape from the deaerator 68. The deaerator 68 is also provided with a pressure safety valve 516. Deaerator 68 is provided with a further pressure release mechanism which includes a check valve 517 and a dump valve 518, the outlet side of the latter being connected by way of a pipe 519 to the auxiliary steam bypass pipe 447 by way of a pipe 519 to the auxilaiary steam bypass pipe 447 by way of which steam may be returned to the desuperheater 46 and condenser 31. If the pressure within the deaerator 68 exceeds 160 pounds per square inch, dump valve 518 opens to dump steam in the deaerator 68 back to the condenser 31. Among other things, this prevents a popping of the safety valve 516.

A pressure transmitter 520 senses the pressure within the deaerator 68 and provides a signal indicative of the value thereof. Level switches 521 and 522 monitor the water level within the low pressure storage tank 69, switch 521 producing an electrical warning signal if the water level is too high and switch 522 producing an electrical warning signal if the water level is too low. A level transmitter 523 produces an electrical signal indicative of the actual water level in the tank 69.

Boiler feedwater stored in the low pressure storage tank 69 is pumped through the economizer tubes 262 in the stack structure 64 by means of a main boiler feed pump 524. The intake side of boiler feed pump 524 is connected to the storage tank 69 by means of a feedwater pipe 525. The outlet side of boiler feed pump 524 is connected to the inlet side of economizer tubes 262 by means of a check valve 526, a motor operated block valve 527 and a feedwater pipe 528. Valve 527 is open during normal operation. The electric motor which runs the boiler feed pump 524 has a nominal rating of 1250 horsepower. A pressure safety valve 529 is connected between the outlet side of pump 524 and the low pressure storage tank 69. A pressure switch 530 monitors the pressure difference across the boiler feed pump 524 and produces an electrical warning signal if such pressure difference falls below a desired lower limit. A further pressure switch 531 monitors the pressure in the feedwater pipe 528 and produces an electrical warning signal if such pressure falls below a desired lower level.

A standby boiler feed pump 532 is connected in parallel with the main boiler feed pump 524 and the valves 526 and 527, the outlet side of this standby pump 532 being connected by way of a check valve 533 and a motor-operated block valve 534 to the feedwater pipe 528 which runs to the inlet of the economizer tubes 262. During normal operation of the steam generator 18, the standby pump 532 is turned off and the block valve 534 is closed. The electric motor which runs the standby pump 532 has a nominal rating of 25 horsepower. The standby pump 532 is used when the steam generator 18 is in either the hot standby mode or the freeze protection mode. At such time, the main boiler feed pump 524 is turned off and its block valve 527 is closed. A pressure safety valve 535 is connected to the outlet side of the standby pump 532 and is connected back to the low pressure storage tank 69. A pressure switch 536 monitors the pressure difference across the standby boiler feed pump 532 and produces an electrical warning signal when the pressure difference is too low.

A manually-operated drain valve 537 is provided for draining the deaerator 68 and low pressure storage tank 69 when the steam generator 18 is to be shut down for maintenance purposes or other desired reasons. A manually-operated vent valve 538 is connected to the economizer feedwater pipe 528 for venting air from the system when the steam generator 18 is being shut down and the system filled with a nitrogen blanket. During normal operation, the drain valve 537 and the vent valve 538 are closed.

During normal load operation, the main boiler feed pump 524 pumps boiler feedwater through the economizer tubes 262, such feedwater being obtained from the low pressure storage tank 69. Under typical peak load conditions, the feedwater leaving the storage tank 69 will be at a temperature of approximately 250° Fahrenheit. As this feedwater flows through the economizer tubes 262, it is heated to within 5° Fahrenheit of the saturation temperature, that is, the temperature at which it will boil at the pressure at hand. Under typical peak load conditions, the feed-water leaving the economizer tubes 262 will be at a temperature of approximately 570° Fahrenheit.

The hot feedwater leaving the economizer tubes 262 goes to two different places. Firstly, some of this feedwater flows by way of a pipe 540, a flow element 541, a feedwater control valve 542, a check valve 543 and a pipe 544 to the feedwater reservoir section 70a of the vertical steam drum 70. The remainder of the hot feedwater leaving economizer tubes 262 flows by way of pipe 540, a flow element 545, a recirculation control valve 546 and a pipe 547 back to the deaerator 68, wherein it serves to provide some of the heating of the condensate entering the deaerator 68.

During normal load operation, the feedwater control valve 542 and the recirculation control valve 546 are automatically controlled in a coordinated manner to keep constant the water flow rate through the economizer tubes 262. For example, if less water is required by the feed-water reservoir 70a (lower load level), then more water is recirculated back by way of the valve 546 to the deaerator 68, the proportions being such as to hold constant the water flow in the pipe 540. As the power generated by steam turbine 36 increases, more economizer water flow is directed to the feedwater reservoir 70a.

Constant water flow through the economizer tubes 262 is important in order to minimize steaming and prevent stagnation in some of the economizer tubes 262 at part loads. If the flow rate were not constant but instead were allowed to vary with load, then the flow rate would decrease as the load decreased. At the lower flow rates, the likelihood of steaming would be greater. The problem with steaming is that it produces an increased pressure drop in the tube wherein it is occurring. This leads to less flow and more steaming and ultimately stagnation or a complete absence of flow in such tube.

In the present embodiment, the flow rate is maintained constant at a relatively high value such that the same high water velocities are provided in the various economizer tubes at all load levels. Thus, the pressure drop across the entire economizer section 262 is relatively high at all load levels. Consequently, any increase in pressure drop caused by steaming in certain tubes is small compared to the total pressure drop, resulting in insignificant changes in water flow and thereby preventing stagnation in any of the economizer tubes 262. In addition, the higher pressure drops produced by the higher water velocities through the economizer tubes 262 promotes a more uniform distribution of water flow through the economizer tubes which, among other things, results in higher heat transfer coefficients on the inside of the tubes.

A further advantage of the constant water flow rate through the economizer tubes 262 is that the main boiler feed pump 524 operates at a constant and optimum rate in terms of pump efficiency for all plant load levels.

A flow transmitter 548 and a temperature element 549 are associated with the feedwater flow element 541, with the flow transmitter 548 providing an electrical signal indicative of the feedwater flow rate through the flow element 541 and the temperature element 549 providing temperature compensation for the flow rate signal. Similarly, a flow transmitter 550 and a temperature element 551 are associated with the recirculation path flow element 545, with the flow transmitter 550 providing an electrical signal indicative of the value of the flow rate of the water flowing back to the deaerator 68 and the temperature element 551 providing temperature compensation for the flow rate signal. A manually-operated drain valve 552 is connected to the feedwater pipe 540 for purposes of draining the economizer tubes 262 when the steam generator 18 is to be shut down. During normal operation, the drain valve 552 is closed.

The hot, nearly boiling feedwater in the feedwater reservoir 70a is pumped through the high pressure evaporator tubes 261 by a high pressure circulation pump 554. The electric motor associated with this pump 554 has a nominal rating of 60 horsepower. The inlet side of the pump 554 is connected to the feedwater reservoir 70a by way of pipe 555. The outlet side of pump 554 is connected to the high pressure evaporator tubes 261 by way of a standby electric heater 556 and a pipe 557. As the hot feedwater flows through the high pressure evaporator tubes 261 it is converted into steam which is then supplied by way of a pipe 558 to the moisture separator section 70b of the steam drum 70. Under typical peak load conditions, the steam leaving the high pressure evaporator tubes 261 will be at a temperature of approximately 575° Fahrenheit.

The high pressure circulation pump 554 is of a type which employs floating ring type seals. The water required for these seals is obtained from the economizer inlet pipe 528 by way of a pipe 560, a water-to-water heat exchanger or cooler 561, a motor-operated control valve 562 and a pipe 563. Heat exchanger 561 cools the 250° Fahrenheit water coming from the feedwater pipe 528 to a temperature of approximately 150° Fahrenheit. The water leaving the pump seals is carried to a drain by way of a pipe 564.

With floating ring type seals, it is necessary to control the flow of water through the seals such that flashing will not occur since flashing of the water through the seals would result in erosion of the labyrinth elements in the seals. To this end, a temperature element 565 is located in the atmospheric collection chamber at the exit of the seals to sense the temperature of the seal water leaving the seals. This temperature element 565 produces an electrical signal which is supplied to a temperature transmitter (not shown) which drives a temperature controller (not shown) which, in turn, controls the motor 566 which operates the seal water control valve 562. This control loop modulates the control valve 562 to assure that only the required amount of water is provided to the pump seals.

Water for the stuffing box in the high pressure circulation pump 554 is supplied thereto from the cooling water source for heat exchanger 561 by way of a pipe 567. The stuffing box water is drained by way of the drain pipe 564. A pressure switch 568 monitors the pressure difference across the pump 554 and produces an electrical warning signal if this pressure becomes too low. A further pressure switch 569 monitors the differential pressure across the seals in pump 554 to provide an electrical warning signal if this pressure differential becomes too low.

The electric heater 556 is used for standby and freeze protection purposes when the gas turbine 12 is not in service. When the gas turbine 12 is not in operation and the steam generator 18 is in the hot standby mode, the heater 556 is controlled by a pressure switch 570 to maintain the proper steam pressure in the steam drum 70. In other words, pressure switch 570 turns on the heater 556 if the steam drum pressure falls below the desired minimum value. On the other hand, if the plant 10 is shut down for an extended period of time and the plant operator chooses not to generate steam in the steam generator 18, then the heater 556 is controlled by a temperature switch 571 to maintain the water in the steam drum 70 above the freezing point. The high pressure circulation pump 554 must be kept on and operating during either of these operating modes for the heater 556.

The moisture separator section 70b of the steam drum 70 receives the wet steam from the high pressure evaporator tubes 261 and removes practically all of the remaining water from such steam. The resulting dry steam leaves the moisture separator 70b and is supplied by way of a steam pipe 572 to the superheater tubes 260 located in the stack structure 64. Under typical peak load conditions, the dry steam leaving the moisture separator 70b is at a temperature of approximately 575° Fahrenheit and a pressure of approximately 1300 pounds per square inch (absolute).

A pressure transmitter 573 generates an electrical signal which indicates the steam pressure at the outlet of the moisture separator 70b. A high pressure vent valve 574 is connected to the steam line 572 for purposes of, among other things, venting some of the steam if it appears that the steam pressure inside the steam drum 70 is becoming too large. During normal operation, the vent valve 574 is closed. The steam drum 70 is also provided with one or more pressure safety valves which for simplicity of illustration, are not shown.

A steam line 575 is connected from the main steam pipe 572 to a deaerator pressure control valve 576 which is, in turn, connected to an additional steam inlet of the deaerator 68. The control valve 576 is controlled by a pressure controller 577 which is responsive to the pressure within the deaerator 68. Pressure controller 577 and control valve 576 function to maintain the desired steam pressure in the deaerator 68 at part loads for the plant 10. If the steam pressure within the deaerator 68 falls below the desired value, then pressure controller 577 opens the valve 576 to bring the pressure back up to the desired value. This is most likely to occur at part loads of less than about 80% because, in such cases, the extraction steam control valve 422 (FIG. 5B) is closed and no extraction steam is being supplied to the deaerator 68.

A nitrogen gas supply 578 is connected to the main steam pipe 572 by way of an actuator-operated nitrogen admission valve 579 and a check valve 580. During normal operation, the nitrogen admission valve 579 is closed and no nitrogen is admitted into the steam system. Valve 579 is opened during the process of draining and venting the steam generator 18 and transferring it to a dry status. The nitrogen valve 579 is opened as more or less the final step in this process. The nitrogen gas is admitted into the steam system for purposes of replacing steam which condenses in the system during the draining and venting process. Among other things, this minimizes subsequent rusting or scaling in the steam drum 70 and the evaporator and superheater tubes 261 and 260. As mentioned elsewhere herein, the gas turbine 12 can be operated for prolonged periods of time with the steam generator 18 in a dry conditions without causing serious damage to the boiler tubes 260–263 and other parts of the steam generator 18.

The feedwater reservoir section 70a of the steam drum 70 is provided with a high-indicating level switch 581, a low-indicating level switch 582 and a level transmitter 583. Switch 581 produces an electrical warning signal when the water level in the reservoir 70a gets too high, while switch 582 produces an electrical warning signal when the water level gets too low. Level transmitter 583 produces an electrical signal indicating the actual water level in the reservoir 70a. The water level signal from the transmitter 583 is supplied to a controller (not shown) which controls the feedwater control valve 542 to maintain a fairly constant water level in the feedwater reservoir 70a.

As the dry steam from the steam drum 70 flows through the superheater tubes 260, it is further heated to raise its temperature another 300° to 400° Fahrenheit. Under typical peak load conditions, the superheated steam flowing in the main steam outlet line 37 is at a temperature of 952° Fahrenheit and a pressure of approximately 1277 pounds per square inch (absolute). During normal operation of the plant 10, this superheated steam flows by way of main steam outlet line 37, isolated valve 38, steam pipe 34 and steam turbine valves 35a, 35b, 308a and 308b to the main steam inlet of the steam turbine 36 (FIG. 5B). Connected in series in the main steam outlet line 37 are a flow element 584 and a check valve 585. A flow transmitter 586 and a temperature element 587 (for temperature compensation of flow transmitter 586) are associated with the flow element 584, the flow transmitter 586 producing an electrical signal indicating the value of the output steam flow rate for the steam generator 18. During normal load operation, the main steam isolation valve 38 is, of course, fully open.

The final output steam temperature for the steam generator 18 is the temperature of the superheated steam flowing in the steam generator outlet line 37. This temperature is primarily determined by the temperature rise of the steam in the superheated tubes 260, this temperature rise being dependent on the temperature of the exhaust gas leaving gas turbine 12 and the amount of supplemental heat added to the turbine exhaust gas by the afterburner 16. The final steam temperature in outlet line 37 is also controlled in part by means of a superheater bypass valve 588 which is connected between the inlet and outlet of the superheated tube section 260. More specifically, the outlet side of bypass valve 588 is connected to the superheated outlet header 264 (FIG. 4) to which is connected the steam generator outlet line 37.

Superheated bypass valve 588 controls the output steam temperature by bypassing some of the lower temperature steam coming from the steam drum 70 around the superheater tubes 260 and then mixing this lower temperature bypassed steam with the higher temperature superheated steam emerging from the superheater tubes 260. Other things being constant, the greater the degree of opening of the bypass valve 588, the greater the amount of the lower temperature steam which is bypassed and, hence, the lower the temperature of the steam flowing to the steam turbine 36. The maximum amount of steam that can be bypassed by the bypass valve 588 is about 20% of the total steam flow from the steam drum 70.

The superheated bypass valve 588 is the final control element in a temperature control loop which is used to regulate the output steam temperature to hold it fairly constant at a predetermined setpoint value. In the present embodiment, this predetermined setpoint value is 925° Fahrenheit. Also included in this temperature control loop is a temperature element 589 which senses the temperature of the steam flowing in the outlet steam line 37 downstream of the bypass valve 588. Temperature element 589 cooperates with a temperature transmitter (not shown) to produce an electrical signal which is transmitted to a temperature controller (not shown) which controls the degree of opening of the superheater bypass valve 588. If the steam temperature in the outlet line 37 is greater than the 952° Fahrenheit setpoint value, then the temperature controller sends a signal to the bypass valve 588 to increase the degree of opening of such valve. This reduces the steam temperature in outlet line 37 to bring it back to the 952° value. Conversely, if the steam temperature in outlet line 37 is less than 952° Fahrenheit, the temperature controller decreases the degree of opening of the bypass valve 588. This causes more steam to pass through the superheater tubes 260 and thus increases the temperature of the steam in the outlet line 37.

This type of temperature control system has several advantages. It is superior to a system in which water is injected into the superheated steam to cool it because such a system could also send slugs of water into the steam turbine if its control valve failed. Since the present system injects dry steam, this is not a problem. The present system is also better than a system which controls steam temperature by varying the afterburner firing rate because it will respond more rapidly to load changes.

There is also connected to the main steam outlet line 37 a normally-closed manually-operated vent valve 590, a pressure safety valve 590a, a temperature element 591 and a pressure transmitter 592. During normal operation, the vent valve 590 and the previously considered drain valve 48 are closed. Temperature element 591 and pressure transmitter 592 generate electrical signals which indicate the temperature and pressure of the steam in the outlet line 37 and transmit such signals to the plant control center building 150.

In certain situations, the main steam isolation valve 38 is closed and the steam produced by the steam generator 18 is bypassed to the condenser 31 by way of an auxiliary steam bypass path which includes a check valve 593, a motor-operated block valve 594 and a steam line 595 which runs to and connects with the auxiliary steam bypass line 447 which communicates with the desuperheater 46 by way of pipes 449 and 404 (FIG. 5B). This particular arrangement wherein the main steam isolation valve 38 is closed and the auxiliary bypass block valve 594 is open is employed, for example, to drain the outlet steam line 37 of water when the No. 1 steam generator 18 is to be started up after the No. 2 steam generator 28 has already been put into operation and is busy supplying steam to the steam turbine 36.

The steam generator 18 further includes an automatic "blowdown" mechanism for minimizing the buildup of mineral deposits on the inner walls of the high pressure evaporator tubes 261. This blowdown mechanism includes a motor-controlled blowdown block valve 596 and a blowdown control valve 597 which are connected in series between the feedwater outlet pipe 555 of the steam drum 70 and an appropriate drain or sewer outlet 597a. During normal operation, the block valve 596 is full open.

The blowdown control valve 597 is controlled by a signal developed by a conductivity element 598 which continuously measures the conductivity of a sample portion of the steam drum feedwater, which sample portion flows by way of the block valve 596 and a cooler 599 to the drain outlet 597a. Conductivity element 598 is connected to the outlet side of the cooler 599, the function of the cooler 599 being to cool the feedwater sample to a temperature suitable for the conductivity element 598. The conductivity element 598 cooperates with a conductivity transmitter (not shown) to generate an electrical signal indicative of conductivity, which signal is transmitted to a conductivity controller (not shown) which controls the blowdown control valve 597.

The conductivity element 598 provides an electrical signal which indicates the electrical conductivity of the feedwater flowing in the steam drum outlet pipe 555. The "hardness" or mineral content of the feedwater in the steam drum outlet pipe 555 determines the conductivity of this feedwater. The greater the hardness or mineral content, the greater the conductivity.

The conductivity element 598 and its associated conductivity controller operate to adjust the degree of opening of the blowdown control valve 597 so as to keep the feedwater mineral content below a desired limit. If the feedwater mineral content increases above the desired limit, then the blowdown control valve 597 is opened to a greater degree to dump a greater amount of the steam drum feedwater into the drain outlet 597a. This tends to lower the water level in the system. This, in turn, signals the makeup water pump 441 and the makeup water valve 442 (FIG. 5B) to add fresh demineralized water to the system. This brings the mineral content of the water in the system back down to the desired level.

As seen from the foregoing description, the heat recovery steam generator 18 includes not only the stack structure 64 and the various boiler tubes 260–263 located therein, but also the deaerator 68, the low pressure storage tank 69, the steam drum 70 and the various other items 501–599 considered in connection therewith.

The normal operation of the heat recovery steam generator 18 will now be briefly summarized for the case where the combined cycle plant 10 is operating under typical peak load conditions. In this case, both of the gas turbines 12 and 22, both of the afterburners 16 and 26, both of the heat recovery steam generators 18 and 28 and the steam turbine 36 are in operation. The condensate pumps 30a and 30b pump condensate at a temperature of approximately 110° Fahrenheit from the condenser hotwell sections 335a and 335b via pipes 430, 431, 432 and 434 to the deaerator 68 wherein such condensate is deaerated and heated to a temperature of approximately 250° Fahrenheit by heat from the steam from the low pressure evaporator tubes 263, the extraction steam from the steam turbine 36 (via steam pipe 424) and the hot water being recirculated from the economizer tubes 262 by way of the recirculation control valve 546 and the pipe 547. This heated 250° water is supplied to the low pressure storage tank 69. At this point, the water is referred to as boiler feedwater.

The boiler feedwater in the storage tank 69 is pumped through the economizer tubes 262 by the main boiler feed pump 524. As this feedwater flows through the economizer tubes 262, heat from the turbine exhaust gas raises its temperature to within 5° Fahrenheit of the saturation temperature, that is, the temperature at which it will boil at the particular pressure at hand. Typically, the hot feedwater leaving the economizer tubes 262 will be at a temperature of approximately 570° Fahrenheit. This hot feedwater flows to the feedwater reservoir 70a of the steam drum 70, the water level in the reservoir 70a being controlled by the feedwater control valve 542.

The hot feedwater in the reservoir 70a is pumped through the high pressure evaporator tubes 261 by the high pressure circulation pump 554. As the feedwater flows through the high pressure evaporator tubes 261, more heat from the turbine exhaust gas converts it into steam having a temperature of approximately 575° Fahrenheit. This steam is supplied to the moisture separator 70b which serves to remove practically all of the remaining moisture from such steam.

The resulting dry steam leaving moisture separator 70b flows by way of steam pipe 572 to the superheater tubes 260. As this steam flows through the superheater tubes 260, heat from the turbine exhaust gas at the gas entry end of the stack structure 64 raises its temperature to a value of approximately 952° Fahrenheit. The resulting superheated steam leaving superheater tubes 260 flows by way of steam generator outlet line 37 and steam pipes 39 and 34 to the steam turbine 36, wherein it is used to drive the rotor blades of the steam turbine 36. At the same time, the second steam generator 28 (FIG. 5C) is similarly making superheated steam which is also flowing to the steam turbine 36 by way of steam pipes 42 and 34, this steam combining with the steam from the first steam generator 18 to produce the total driving force for the steam turbine 36.

As will be considered in greater detail hereinafter, when the combined cycle plant 10 is operating above a minimum load level with both steam generators 18 and 28 in operation, the steam turbine 36 is operated in a pure turbine following mode. In this mode, the steam turbine bypass valve 45 (FIG. 5B) is fully closed and the steam turbine governor or control valves 35a and 35b and throttle or stop valves 308a and 308b are all fully open. In this case, the power developed by the steam turbine 36 is determined entirely by the steam generated by the steam generators 18 and 28 which is, in turn, determined by the operating levels of the gas turbines 12 and 22 and the afterburners 16 and 26.

The hot gas produced by the gas turbine 12 and the afterburner 16 (FIG. 5D) flows vertically upward in the stack structure 64 (FIG. 5A). On the other hand, the fluid in the superheater tubes 260 and the economizer tubes 262 flows in a downward direction, counter to the direction of gas flow. This downflow or counterflow in the superheater and economizer sections 260 and 262 provides better heat transfer for the steam and water moving through these sections. In the evaporator sections, namely, the high pressure evaporator 261 and the low pressure evaporator 263, the water and steam flow is in the upward direction which is the same direction as that of the hot gas flow. This is of particular importance with respect to the high pressure evaporator 261. Since the process of evaporation is isothermal, the temperature advantage is the same for either an upflow or a downflow design. The upflow design used for the high pressure evaporator section 261 is, however, more advantageous in that it permits operation at part loads by means of natural circulation should there be a failure of the high pressure circulation pump 554.

Considering now the No. 2 heat recovery steam generator 28 (FIG. 5C), it is noted that this steam generator 28 includes, in addition to the elements previously considered, various elements bearing reference numerals 601 through 699, inclusive. These elements 601–699 are the same as elements 501–599, respectively, previously considered for the first steam generator 18 (FIG. 5A). These elements 601–699 serve the same purposes and function in the same manner as do the corresponding ones of counterpart elements 501–599 in the first steam generator 18. Thus, the second steam generator 28 is of the same construction as and operates in the same manner as does the first steam generator 18. for this reason, a detailed description of the second steam generator 28 will not be given herein.

As shown in FIGS. 5D–5F, the combined cycle plant 10 further includes means for supplying fuel to the two gas turbines 12 and 22 and to the two afterburners 16 and 26. In the present embodiments, this fuel may be either natural gas or distillate type No. 2 grade fuel oil. Natural gas is obtained from a gas supply 700 (FIG. 5E) which may be, for example, a gas distribution line tied to a natural gas utility system. This gas is supplied to the combined cycle plant 10 by way of a gas pressure regulator 701. The fuel oil, on the other hand, is obtained from a fuel oil storage tank 702 located off of but immediately adjacent to the plant site 155. This fuel oil is pumped to the plant site 155 proper by means of a fuel forwarding pump 703. Appropriate control mechanisms are provided so that the plant operator may readily select the particular fuel to be used.

Associated with the first gas turbine 12 is a fuel system 705 (FIG. 5D) for supplying the gas and oil fuels thereto. The gas turbine fuel system 705 includes an oil delivery system 706 which is connected between the outlet of the fuel forwarding pump 703 and the combustion section 161 of the gas turbine 12. As previously indicated, the combustion section 161 includes an array of 16 combustion chambers of combustors 167a–167p. For simplicity of illustration, only the combustor 167a is shown in FIG. 5D. Starting with the fuel forwarding pump 703, the oil fuel system 706 includes, in the order named, a low pressure filter 707, a main fuel pump 708, an overspeed trip vlave 709, a oil throttle valve 14a, a high pressure filter 710, a isolation valve 711 and a fuel distributor or flow divider 712. Connected to the 16 outlets of the flow divider 712 are 16 outlet lines 713a–713p which run to the different individual combustors 167a–167p, respectively. During normal operation an oil fuel, the overspeed trip valve 709 and the isolation valve 711 are full open.

Flow divider 712 includes a rotary mechanism which serves to divide and distribute the oil fuel in an equal manner to the 16 outlet lines 713a–713p. During normal operation, the flow divider 712 operates under its own power, so to speak, the flow of the high pressure oil through the flow divider 712 serving to cause the rotation of the rotary distributor mechanism therein. An electric starting motor 714 is coupled to the rotary shaft of the flow divider 712 for purposes of insuring a proper initial startup of the flow divider 712. Once the oil flow exceeds a predetermined relatively low value such as, for example, 4%, the starting motor 714 is turned off and the flow divider 712 operates on its own.

Also coupled to the rotary shaft of the flow divider 712 is a speed pick-up device or speed transducer 715 which produces an electrical signal indicative of the rotary speed of the flow divider 712. Since this rotary speed is proportional to the fuel flow rate through the divider 712, the signal generated by the transducer 715 is also indicative of the fuel flow rate. For this reason, the transducer 715 will hereinafter be referred to as a flow transmitter and will be thought of as providing a signal indicative of the fuel flow rate.

The inlet side of a pressure regulating valve 716 is connected to the oil line intermediate the main fuel pump 708 and the overspeed trip valve 709, the outlet side of this valve 716 being connected by way of oil return lines 717 and 718 to an oil return inlet on the fuel oil tank 702. A pressure controller 720 measures the oil pressure on the output side of the main fuel pump 708 and adjust the pressure regulating valve 716 in accordance therewith so as to hold the oil pressure at this point in the system substantially constant.

A pressure switch 721 monitors the oil pressure on the output side of the low pressure filter 707, while a differential pressure switch 722 monitors the pressure difference across the low pressure filter 707. Pressure switch 722 produces an electrical warning signal when the pressure difference becomes too high. A pressure transmitter 723 produces a signal indicative of the oil pressure on the output side of the main fuel pump 708. A further pressure transmitter 724 generates a signal indicative of the oil pressure of the oil being supplied to the flow divider 712.

The gas turbine fuel system 705 further includes a gas delivery system 730 for supplying natural gas from the gas supply 700 to the turbine combustors 167a–167p. Starting with the pressure regulator 701 (FIG. 5E), this gas system 730 includes, in the order named, a strainer 731, an overspeed trip valve 732, a gas throttle valve 14b, an isolation valve 733 and a gas manifold 734. The 16 outlets of the gas manifold 734 are connected by way of fuel outlet lines 735a–735p to different individual ones of the 16 combustors 167a–167p, respectively. During normal operation on natural gas, the overspeed trip valve 732 and the isolation valve 733 are fully open, the flow of the gas fuel being controlled by the degree of opening of the throttle valve 14b.

Electrical type pressure switches 736, 737 and 738 are connected to the gas delivery line intermediate the strainer 731 and the overspeed trip valve 732 and are used to monitor the gas pressure at this point in the system. Pressure switch 736 is closed if the gas pressure is above a predetermined value, while pressure switches 737 and 738 are open if the pressure is above a predetermined value. A vent valve 739 is connected to the gas delivery line on the outlet side of the overspeed trip valve 732. This valve 739 is closed during normal operation but can be opened to vent the system when the overspeed trip valve 732 is closed.

A further fuel system 740 is provided for the afterburner 16. This fuel system 740 includes an oil delivery system 741 for supplying fuel oil from the tank 702 to the burner elements in the afterburner 16. Starting with the fuel forwarding pump 703 (FIG. 5E), this afterburner oil system 741 includes, in the order named, the low pressure filter 707, a fuel delivery line 742, a main afterburner fuel pump 743, an overspeed trip valve 744, an oil throttle valve 19a and an isolation valve 745. A pressure regulating valve 746 is connected to the oil delivery line on the outlet side of the main fuel pump 743 to maintain a constant oil pressure at this point in the system. The outlet side of the pressure regulating valve 746 is connected by way of an oil return line 747 and the oil return line 718 to the return inlet on the fuel oil tank 702. Pressure regulating valve 746 is controlled by a pressure controller 748 which responds to the oil pressure in the oil delivery line coming from pump 743.

During normal operation on oil, the overspeed trip valve 744 and the isolation valve 745 are full open, the flow of oil to the afterburner 16 being controlled by the throttle valve 19a. A pressure transmitter 749 generates a signal indicative of the oil pressure in the delivery line from pump 743, while a further pressure transmitter 750 generates a signal indicative of the oil pressure at the inlet to the afterburner 16.

The afterburner fuel system 740 further includes a gas delivery system 751 for delivering natural gas from the gas supply 700 to the burner elements in the afterburner 16. Starting with the pressure regulator 701 (FIG. 5E), this afterburner gas system 751 includes, in the order named, the strainer 731, the overspeed trip valve 732, a pressure regulator 752, a gas throttle valve 19b and an isolation valve 753. It is noted that the gas overspeed trip valve 732 is common to both the turbine gas system 730 and the afterburner gas system 751. A vent valve 754 is connected on the outlet side of the isolation valve 753 for venting the latter portion of the system when the isolation valve 753 is closed. A pressure transmitter 755 senses the gas pressure at the inlet of the afterburner 16 and produces a signal indicative of the value thereof.

There is associated with the second gas turbine 22 a fuel system 805 (FIG. 5F) which is identical in construction to the fuel system 705 for the first gas turbine 12. This No. 2 gas turbine fuel system 805 includes items 806–839 which are identical in construction and purpose to the corresponding respective ones of items 706–739 in the No. 1 gas turbine fuel system 705. In a similar manner, there is associated with the second afterburner 26 a fuel system 840 (FIG. 5F) which is identical in construction to the fuel system 740 for the first afterburner 16. This No. 2 afterburner fuel system 840 includes items 841–855 which are identical in construction and purpose to the corresponding respective ones of items 741–755 in the No. 1 afterburner fuel system 740. The No. 2 gas turbine fuel system 805 and the No. 2 afterburner fuel system 840 are connected to the gas supply 700 and the fuel oil storage tank 702 in the same manner as the No. 1 gas turbine and afterburner fuel systems 705 and 740.

The second gas turbine and afterburner fuel systems 805 and 840 are operated independently of the first gas turbine and afterburner fuel systems 705 and 740. Thus, among other things, the second gas turbine 22 and the second afterburner 26 can be in operation while the first gas turbine 12 and the first afterburner 16 are out of service, or vice versa.

As shown in FIG. 5E, the combined cycle plant 10 further includes a pair of chemical treatment systems 901 and 902 for injecting various chemicals into the condensate/feedwater/steam systems associated with the first and second heat recovery steam generators 18 and 28 for minimizing corrosion and the buildup of mineral oil deposits in the boiler tubes, steam drums, storage tanks and the like. The first chemical treatment system 901 is primarily associated with the first steam generator 18 and the second chemical treatment system 902 is primarily associated with the second steam generator 28 though, as will be seen, there is some degree of overlap. The particular chemicals which are injected in the present embodiment are amine (or ammonia), hydrazine and phosphates. As used in FIG. 5E, the letter "A" denotes amine (or ammonia), the letter "H" denotes hydrazine and the letter "P" denotes phosphates.

The first chemical treatment system 901 takes a first fluid sample from a first sample outlet S1 (FIG. 5A) wich is located on the feedwater pipe 525 coming from the low pressure storage tank 69, analyzes it and then automatically injects the proper amount of amine (A1) and hydrazine (H1) into the system via the chemical injection inlet CH1 (FI. 5A) which is also located on the feedwater pipe 525, but upstream of the sample outlet S1. The first chemical treatment system 901 also takes a second fluid sample from the system by way of sample outlet S2 (FIG. 5B) which is connected to the condensate pipe 434 running to the deaerator 68, analyzes it and then automatically injects the appropriate amounts of amine (A2) and hydrazine (H2) into the system via the chemical injection inlet CH2 (FIG. 5B) which is connected to the condensate pipe 432 located immediately upstream of the condensate pipe 434. Phosphate (P1) is injected into the system by way of a phosphate injection inlet P1 (FIG. 5A) which is located on the feedwater pipe 544 at the inlet to the feedwater reservoir 70a of the steam drum 70. The phosphate injection control is manually in nature. The injection rate is adjusted at periodic intervals by the plant operator after studying the results of the chemical analyses which are automatically performed and recorded by equipment included in the chemical treatment system 901.

The second chemical treatment system 902 (FIG. 5E) is of the same construction as the first chemical treatment system 901. Sample outlet S3 (FIG. 5B) is located on the condensate pipe 435 running to the deaerator 90, while sample outlet S4 (FIG. 5C) is located on the feedwater pipe 625 coming from the storage tank 91. The chemical injection inlet CH3 is located on the condensate pipe 432 (FIG. 5B), while the chemical injection inlet CH4 is located on the feedwater pipe 625 (FIG. 5C). The phosphate injection inlet P2 is located on the feedwater pipe 64 at the inlet of the feedwater reservoir 92a (FIG. 5C).

D. Plant Control System

The plant control system 50 is organized to operate the plant equipment safely through startup and loading with high reliability so that the plant is highly and quickly available to meet power demanded from it. To achieve this purpose, the plant control system is preferably embodied in digital/analog hybrid form, and the digital/analog interface is preferably disposed in a way that plant protection and plant availability are enhanced.

Generally, the total plant power is controlled by controlling the operating level of the turbines and the afterburners, but the steam turbine goes into a follow mode of operation once the steam bypass valves are closed and the steam turbine inlet valves are fully opened. In the follow mode, the steam turbine produces power at a level dependent on the steam conditions generated by the heat inputs to the steam generators.

Figure 6:
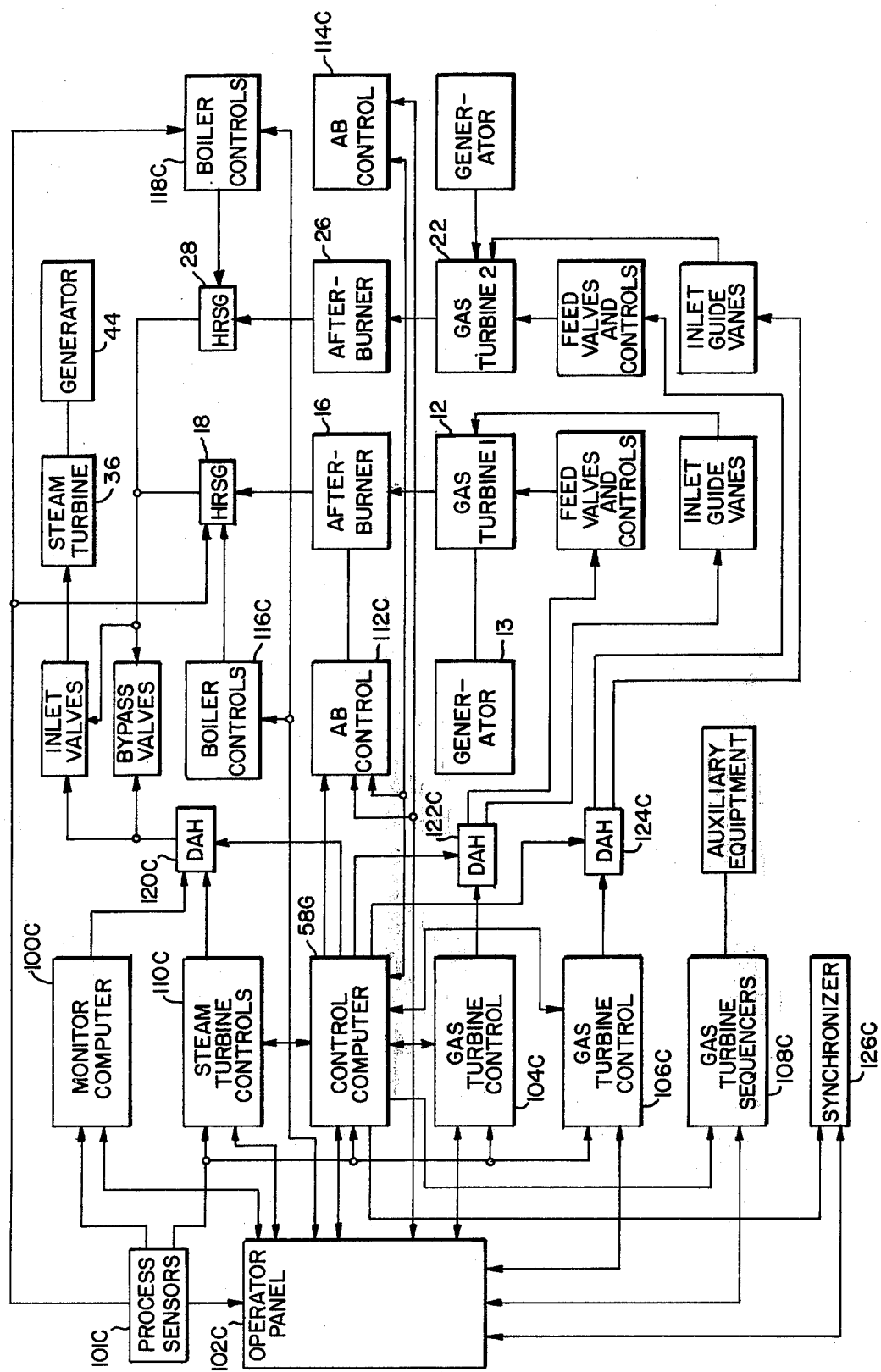
FIG. 6 shows a schematic view of a control system arranged to operate the combined cycle electric power plant of FIG. 1 in accordance with the principles of this invention.

As shown in FIG. 6, the control system 50 includes a digital control computer 58G, a digital monitor computer 100C and various analog controls for operating the plant equipment in response to process sensors 101C while achieving the described objectives. In this instance an automatic startup control for the steam trubine 36 is largely embodied in the monitor computer 100C. An operator panel 102C provides numerous pushbutton switches and various displays which make it possible for the plant to be operated by a single person. The pushbutton switches provide for numerous operator control actions including plant and turbine mode selections and setpoint selections.

In the operator analog or manual mode of operation, the operator sets the fuel level for the gas turbines 12 and 22 and the afterburners 16 and 26 through gas turbine controls 104C and 106C during loading, but an analog startup control included in each of the gas turbine controls 104C and 106C automatically schedules fuel during gas turbine startups. In addition, sequencers 108C start and stop auxiliary equipment associated with the gas turbines during gas turbine startups. The turbine bypass steam flow and the turbine inlet steam flow are controlled by operator valve positioning implemented by a steam turbine control 110C during steam turbine startup and loading in the operator analog mode. Certain automatic control functions are performed for the steam and gas turbines by the controls 104C, 106C and 110C in the operator analog mode.

In the operator automatic mode, the computers 58G and 100C perform various control functions which provide for automatic startup and atuomatic loading of the gas and steam turbines under the direction of the operator on a turbine-by-turbine basis. Afterburner controls 112C and 114C and boiler controls 116C and 118C operate under operator setpoint control during the operator analog and operator automatic modes. Respective digital/analog hybrid circuits 120C, 122C and 124C interface the digital and analog controls.

Under plant coordinated control, the computer 58G generally directs the plant operation through startup, synchronization and loading to produce the plant power demand. The extent of coordinated plant control is dependent on the existing plant configuration, i.e., according to the availability of apparatus for operation or for coordinated operation. For example, if a gas turbine is shut down, it is excluded from coordination. Similarly, if the gas turbine has been excluded from coordinated control by the operator, the computer 58G will operate accordingly. In all coordinated control cases, the boiler controls 116C and 118C function separately, i.e., they react automatically to operator setpoints and signals generated by the process sensors 101C to control the steam generators according to plant conditions produced by coordinated turbine and afterburner operations. The computer 58G provides setpoint signals for the afterburners in the coordinated control mode but not in the operator automatic mode. Coordinated control provides the highest available level of plant automation, and the operator automatic and operator analog modes provide progressively less automation. Some parts of the analog controls function in all of the plant modes.

Generator synchronization is performed by a synchronizer 126C under operator control or under computer control in the coordinated mode. Generally, the respective generators are sequenced through synchronization by switching actions applied to the synchronizer inputs and outuputs.

Once the plant reaches hot standby and either gas turbine or both gas turbines have been started, the steam turbine can be started when minimum steam supply conditions have been reached. Thereafter, the turbines are accelerated to synchronous speed, the generators are synchronized and the fuel and steam valves are positioned to operate the turbines at the demand load levels. The manner in which the control system 50 is configured and the manner in which it functions throughout startup and loading depends on the selected plant mode and the selected or forced plant configuration and the real time process behavior.

E. Boiler Feed Pump Flow Control

Figure 7:
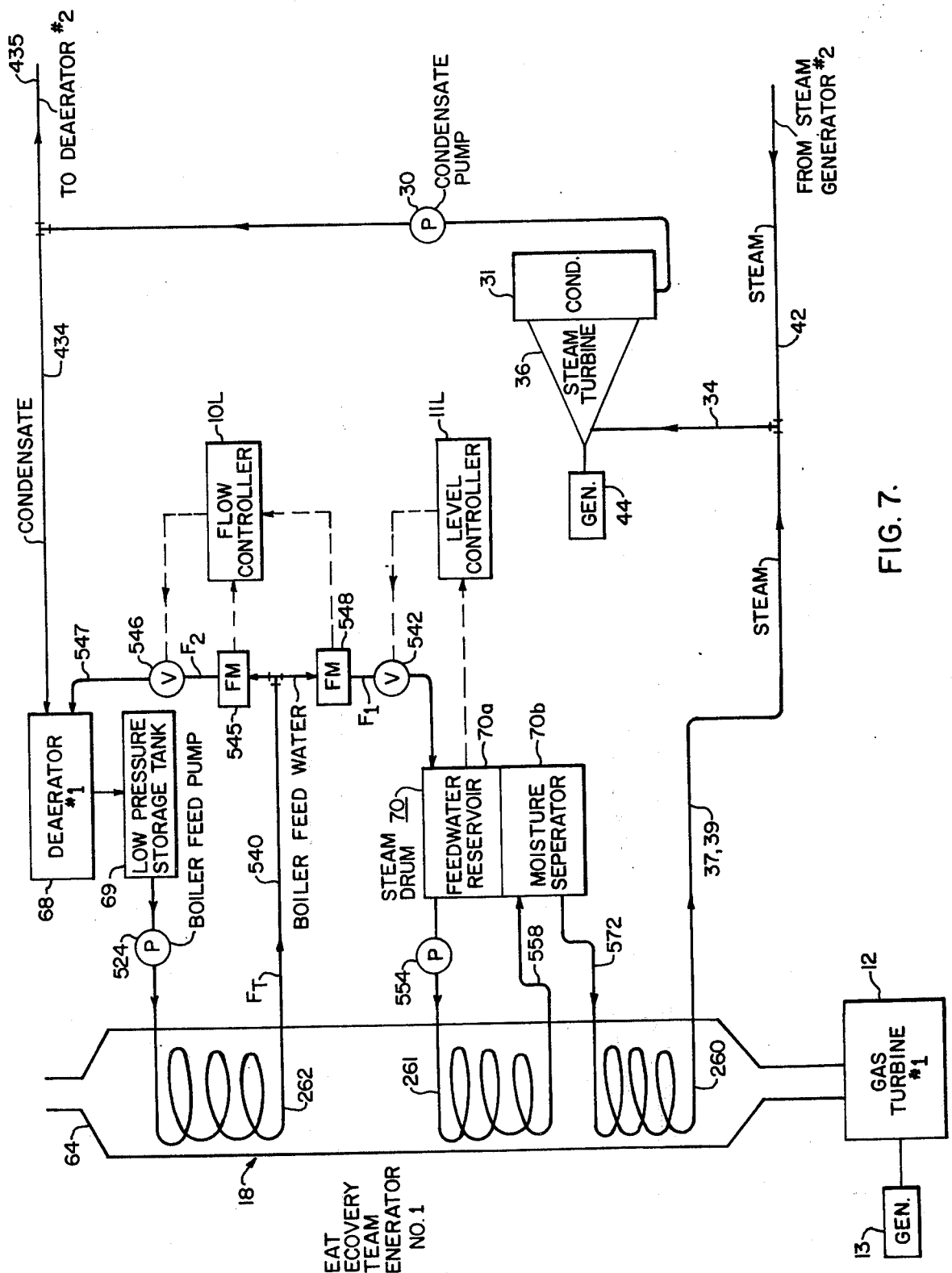
FIG. 7 is a simplified, schematic diagram illustrating selected parts of the heat recovery steam generator and the control system therefor.

As generally illustrated in FIG. 7, this invention relates to the apparatus and method of controlling the boiler feed pump 524 at a constant operating point to achieve the desired substantially constant flow rate $P_T$ through the economizer coil 262, over wide variations of steam requirements for the steam turbine 36. The boiler feed pump 524 operates most efficiently at a constant flow, which flow rate is chosen in view of the characteristics of the boiler feed pump 524 and to ensure the greatest heat transfer efficiency between the turbine heated gases passing through the heat recovery steam generator 18 and the water directed through the economizer coil 262. The flow rate or "water consumption rate" $F_1$ required by the steam drum 70 is dependent upon the steam requirements of the steam turbine and in turn upon the load placed upon its associated electrical generator 44. Basically, a recirculation path in the form of the conduit 547 is provided between the outlet of the economizer coil 262 and an inlet to the deaerator 68, whereby the flow difference $F_2$ in the constant flow $F_T$ directed through the economizer coil 262 and the variable flow directed to the steam drum 70, is directed by the recirculation conduit 547 to the deaerator 68.

In order to focus attention upon the pertinent portions of the combined cycle electrical power plant first described with respect to FIGS. 5A to 5F, simplified representation thereof provided by FIG. 7. As shown therein, the first gas turbine 12 drives a generator 11. The exhaust gases from the gas turbine 12 are passed through a heat recovery steam generator 18 to heat in the order shown, the superheater coil 260, the high pressure coil 261 and the economizer coil 262.

As superheated steam is directed by the header or conduit 34 into the steam turbine 236, its energy is spent and is passed into the condenser 31, where it is converted into condensate water. As shown in FIG. 7, the water is recirculated as by the condensate pump 30 along conduit 434 to the first deaerator 68 and along conduit 435 to a second deaerator. The water or condensate stored in the deaerator 68 is at a temperature of approximately 300°F. This water is pumped through the economizer coil 262 by the boiler feed pump 524. In an illustrative embodiment of this invention, the boiler feed pump 524 was selected to be one as manufactured by the Bingham Pump Company of Portland, Oregon, under their designation MSD-D 9STG's with an impeller of a diameter of 10-⅜ inches. In the economizer coil 262, a heat transfer is effected between the turbine exhaust gases and the condensate passing through the economizer coil 262, whereby the water temperature is raised to approximately 550°F. In turn, this heated water is directed by conduit 540 to the recirculation conduit 547 and also through the flowmeter 541 and the feedwater control valve 542 to the steam durm 70. As explained above, steam durm 70 includes a hot water storage section 70a and a moisture separator section 70b; the section 70a, in actual construction, is located beneath section 70b. The hot water in the storage section 70a is pumped through the high pressure evaporator coil 261 by the high pressure circulation pump 554. The high pressure evaporator coil 261 converts the hot water into wet steam, which wet steam is then supplied to the moisture separator section 70b. The dry steam leaving the moisture separator section 70b is at a temperature of approximately 675°F. Next, the dry steam is superheated by the supperheater coil 260 to a temperature of approximately 950°F before being directed along conduits 37, 39 and 34 to the input side of the steam turbine 36. The steam turbine 36 drives the generator 44 and the spent steam is returned to the condenser 31. This completes the steam condensate loop.

The flow rate to the steam drum 70 is determined by the feedwater flow control valve 542, which, in turn, is controlled by a level controller 11L. A level transducer 582, as shown in FIG. 5A, produces an electrical output signal indicative of the water level stored in section 70a, which signal is supplied to the level controller 11L. In turn, the level controller 11L transmits a control signal to the feed-water valve 542 to regulate the valve to maintain substantially constant the water level in the storage section 70a. Water is drained from the storage or reservoir section 70a at a rate dependent upon the steam requirements of the turbine 36 to meet the electrical loads placed thereon. Thus, as more or less water is required to be converted into steam, the level controller 11L selectively opens and closes the valve 542 to introduce water into the steam drum 70.

Figure 8:
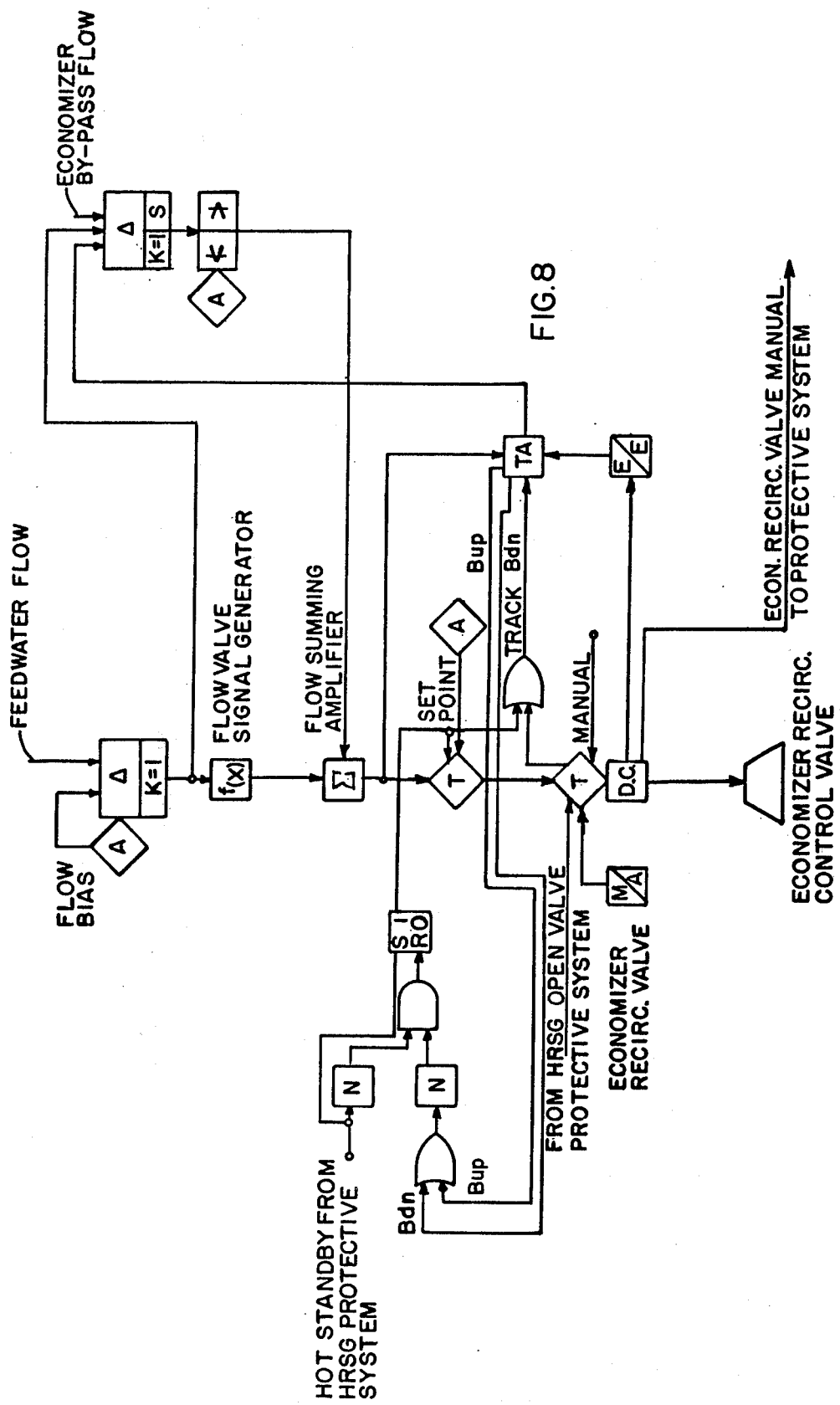
FIG. 8 shows a functional diagram of a feedwater pump control in accordance with the teachings of this invention.

A further controller 10L, to be described with respect to FIG. 8, is provided to hold constant the water flow rate $F_T$ through the economizer coil 262 as pumped by the boiler feed pump 524, even though the feedwater flow rate $F_1$ is subject to variation. As shown in FIG. 7, the flow controller 10L is responsive to the output signals of the flowmeters 541 and 545 to selectively open and close the recirculation flow control valve 546, whereby the recirculation flow $F_2$ to the deaerator 68 is selectively controlled according to the difference between the substantially constant economizer coil flow rate $F_T$ and the variable feedwater flow rate $F_1$.

The recirculation of heated water to the deaerator 68 provides a significant advantage in that the overall efficiency of the steam generator 18, particularly at relatively low loads, is significantly increased. In particular, when operating at relatively low loads (as placed upon the generator 44 coupled with the steam turbine 36), relatively low rates of steam flow are required; therefore, the feed-water to be directed as by pump 524 into the storage or reservoir section 70a of the steam drum, is relatively low. In prior art boiler systems, a feedback recirculation path is not provided to the deaerator 68; as a result, under low load conditions, a correspondingly low flow rate of water is established through the economizer coil 262 before being directed into the steam drum 70. At relatively low flow rates through the economizer coil 262, only a portion of the heat available from the exhaust gases of the gas turbine 12 is transferred to the circulating water and a substantial portion of the available heat is lost as it passes from the heat recovery steam generator 18 through its louvre 357 (see FIG. 5A). By contrast, the steam generator control as described herein operates the boiler feed pump 524 at a substantially, relatively high rate whereby the feedwater flow $F_T$ through the economizer coil 262 is likewise high to achieve a relatively high heat absorption from the exhaust gases.

A further advantage is that the water recirculated by conduit 547 to the deaerator 68 is at a relatively high temperature compared to that of the condensate introduced by conduit 434 into the deaerator 68. As explained above, the deaerator 68 not only functions to remove undesired air from the conduit condensate, but also to provide an initial heating of the water before it is introduced into the economizer coil 262. Thus, the heated water provided by the recirculation conduit 547 reduces the amount of heat that must otherwise be supplied to the deaerator 68 to achieve the desired initial heating of the condensate. As shown in FIGS. 5A and 5B, heat is otherwise supplied to the deaerator 68 by extraction steam taken from an intermediate stage of the steam turbine 36 and passed to the deaerator 68 along conduits 410, 424 under the control of the extraction steam valve 512. As shown in FIG. 5A, the extraction steam is introduced by conduit 513 into the deaerator 68 to achieve the desired initial heating of the conduit condensate. It is understood that the heat provided through the recirculation conduit 547 reduces the amount of heat that must be supplied from the steam turbine 36. In the operation of conventional heat recovery steam generators, extraction steam is available from the steam turbine when it is operating at a level in the order of 85–90% of full load. Thus, under most operating conditions, condensate is introduced into the deaerator, but is not heated. By contrast, the recirculation of the heated water, now steam, through the recirculation path 547 to the deaerator 68 permits an introduction of sufficient heat by the recirculated steam such that the condensate water introduced from the conduit 434 may be heated to a sufficient degree whereby it is converted into steam at relatively low operating conditions as compared with that required of the prior art heat recovery steam generator systems. In a sense, the recirculation of the heated water to the deaerator 68 permits the deaerator 68 and its low pressure storage tank 69 to act as a heat storage means, particularly at relatively low load demand levels, wherein the heat contained within the exhaust gases of the gas turbine 12 would otherwise be lost from the heat recovery steam generator 18.

A further advantage of establishing a uniform, relatively high flow rate through the economizer coils 262 is that the possibility of producing "hot spots" and therefore steaming within portions of the economizer coil 262 is significantly reduced. If a particular portion of the economizer coil 262 is heated to a higher temperature than the remaining portions, steam may be produced at that portion. If the water flow rate through the economizer coil 262 is not high enough to remove the steam thus produced, the steam may build up, serving to block or stagnate the passage of water therethrough. If sufficient steaming occurs, the water flow through the economizer coil 262 may be entirely blocked. Thus, if a sufficiently high rate of water flow is established, the effects of steaming may be substantially reduced and the water flow therethrough ensured. In addition, the higher water flow ensures a higher pressure drop across the economizer coil ensuring a more uniform distribution of water flow therethrough and thereby increasing the heat transfer coefficient on the inside of the tubes making up the economizer coil 262. A further advantage of the constant water flow rate $F_T$ is that the main boiler feed pump 524 may be operated at a constant, substantially optimum rate in terms of pump efficiency for all plant load levels.

The rate at which the boiler feed pump 524 is driven is selected according to those pressures required to be developed and placed upon the boiler feed pump 524 and at the inlet of the reservoir section 70a of the steam drum 70 during times of maximum load. With regard to the first requirement, it is seen as from FIG. 7 that the flow through the economizer coil 262 is in a downward direction, as opposed to the operation of most economizer coils in which the water flow is directed upward. Thus, it is important that a head of pressure be developed upon the boiler feed pump 524 under different load conditions such that suction is not broken across the pump, causing the pump to cavitate and to be destroyed thereby. At higher load demands, more flow is required to be directed to the stream drum 70 by the boiler feed pump 524, thus causing the water returned through recirculation conduit 547 to be decreased. As a result, the water returned to the deaerator 68 and thus to the storage tank 69 is reduced. Thus, the flow rate established by the boiler feed pump 524 must be sufficient that even under high load demand, sufficient water is returned to and pressure developed within the storage tank 69 such that the boiler feed pump 524 is not damaged. In addition, the flow rate established by the boiler feed pump 524 must be sufficient that even under high load demands wherein the rate at which steam is withdrawn from the drum 70 is high and a relatively high pressure is developed therein, that a sufficient pressure is established upon the inlet of the steam drum 70 to force the steam into its reservoir portion 70a. In an illustrative embodiment, the boiler feed pump flow rate $F_T$ is chosen to be 488,000 pounds per hour at a pressure in the order of 1450 psig. At such a flow rate and pressure, a pressure in the order of about 1300 psig may be maintained against the inlet of the feedwater control valve 542, sufficient to force water into the feedwater reservoir section 70a, wherein a pressure in the order of about 1250 psig is established at full load conditions.

E-1. Control Functions Of Boiler Feed Pump Flow Rate

In FIG. 8, there is shown in more functional detail an electrical diagram of the flow controller 10L, generally shown in FIG. 7. The feedwater flow signal $F_1$ as provided by the flow transmitter 548 (coupled to the flow element 541 inserted within the conduit leading to the inlet of the steam drum 70), is supplied to a subtraction circuit 12L associated with a proportional funtion block 13L; a bias setpoint is entered at block 15L indicative of the desired constant flow rate to be established by the boiler feed pump 524 through the economizer coil 262, and provides a bias signal $F_T$ representing the desired constant flow rate to the other input of the subtraction circuit 12L. The calculated difference signal $F'_2 = F_T - F_1$ appearing at the output of the proportional functional block 13L represents the desired constant flow rate through the boiler feed pump 524 and the economizer coils 262. The calculated difference signal $F'_2$ is applied to a flow valve signal generator 14L which converts the calculated signal $F'_2$ to a valve position signal, which in turn is applied by way of a flow summing amplifier 16L, transfer function or switch blocks 24L and 50L, and a driver card 54L to the recirculation control valve 546. The blocks 12L and 13L, 14L and 16L form the primary chain of command for the recirculation control valve 546.

If it may be assumed that there are no errors in the input signals or the manner in which these circuits operate and if the recirculation control valve 546 is performing in an ideal manner, then the desired control of the valve 546 is realized in that it is selectively opened and controlled to permit a water flow therethrough to the deaerator 68 according to the difference between the desired constant flow $F_T$ through the economizer coil minus that water flow $F_1$ to the steam drum 70. Since in practice errors and inaccuracies occur, e.g., the manner in which the recirculation valve 546 responds to its control input signal, a further control function is provided to compensate for such inaccuracies. In particular, the recirculation flow through the conduit 547 and the flow element 545 (see FIG. 5A) is sensed by the flow transmitter 550 to provide an electrical signal indicative thereof, to be supplied to a second subtraction circuit 18L. The calculated signal $F'_2$ likewise is applied to the second subtraction circuit 43, to provide a difference or error signal to be applied to a proportional plus integral function circuit 20L. In turn, the output of the proportional plus integral circuit 20L is applied to a high-low limiting circuit 22L to provide a trim or error signal to be applied to the second input of the flow summing circuit 16L. The limits of trim are applied by way of a setpoint block 21L to the high-low limiter 22L, whereby the extent of the influence of the error or difference signal is limited. For example, if some element within the system such as the transmitter element 550 failed, the trim signal would have an unnecessarily large influence on the recirculation control valve position. Thus, in view of the normally limited influence exerted by the trim signal upon the recirculation control valve position, the high-low limiting circuit 22L limits the influence of the difference signal to a range, e.g. 50%, of the operation of the valve 546. The proportional plus integral block 20L amplifies the difference signal and introduces some time lag to prevent too quick a response to the difference or trim signal. The resulting trim signal is provided to correct any remaining error in the setting of the recirculation control valve 546.

In order to initiate the operation of the combined cycle electric power generating plant as described above with regard to FIG. 1, it is necessary to first place the steam generating equipment in a "STANDBY" condition before steam may be transferred to the steam turbine 36, i.e. operate in a "RUN" mode. For a more complete description of the startup operation of the combined cycle electric power generating plant, reference is made to the above-identified application Ser. No. 495,765. Briefly, the steam generating system is placed in a STANDBY mode of operation wherein the boiler feed pump 524 is turned off, and the auxiliary pump 532 (see FIG. 5A) is turned on to initiate a circulation of water through the economizer coil 262 to the steam drum 70 and also through the recirculation conduit 547 to the deaerator 68. In this manner, a predetermined minimal flow of steam or water is established within the steam generating system before the steam turbine 36 is operated to recirculate condensate through the steam generator 18 to be heated into steam and to be returned to the steam turbine 36. Further, it is understood that the flow controller 10L is operated as described above with respect to FIG. 8 in the RUN mode of operation to set the position of the recirculation control valve 546. However, in a STANDBY mode of operation, the degree of opening of the control valve 546 is set at a minimal value to permit a corresponding flow through conduit 547 to the deaerator 68. With respect to FIG. 8, the desired opening of the recirculation control valve 546 during the STANDBY mode of operation, is entered into the flow controller 10L by a standby setpoint block 26L. The setpoint value in turn is applied to the transfer function or switch block 24L, which acts essentially as a switch to permit a signal indicative of the recirculation control valve opening to be derived from either the flow summing amplifier 16L or the standby setpoint block 26L. Thus, when a command signal as derived from either the digital computer 58c (see FIG. 4) or from an operator actuated pushbuttom on the panel 102c (see FIG. 4) is supplied, a flip-flop 42L is set to produce a 1 output to the transfer function block 24L, whereby the STANDBY control valve position is applied by way of the transfer function block 24L, the transfer function block 50L and the drive card 54L to the recirculation control valve 546.

In switching mode of operation from STANDBY to RUN, it is necessary to ensure a bumpless transfer of the control signal as it is applied to the recirculation control valve 546, i.e. there must not be a discontinuity in the level of the signal applied thereto. To ensure a bumpless transfer, a comparison is made between the position control signal as developed by the flow summing amplifier 16L and the previous setting of the recirculation control valve 546 as derived from the drive card 54L, by a transfer amplifier 30L acting as a comparator to derive a difference signal between the actual setting of the recirculation control valve 546 and that opening setting as would be commanded by the output of the flow summing amplifier 16L. The output of the drive card 54L is applied to an isolation block 56L wherein its voltage level is suitably shifted so as to match that as derived from the amplifier 16L and applied to the transfer amplifier 30L. An output of the transfer amplifier 30L representing the integral of the difference between the output of the driver card 54L and the flow summing amplifier 16L, is applied to the third input of the second subtraction circuit 18L wherein it is summed with the calculated water flow signal $F'_2$ and the measured signal $F_2$ of the water flow. The output of the subtraction circuit 18L is supplied by the proportional plus integral block 20L and the high-low limiting circuit 22L to the flow summing amplifier 16L, whereby its output is driven under the influence of the transfer amplifier 30L toward a value corresponding to the actual opening of the recirculation control valve 546.

If an output is derived from the transfer amplifier 30L other than substantially zero, the opening of the recirculation control valve 546 is maintained at the position set into the flow controller 10L by the setpoint block 26L as opposed to the valve position signal as derived from the flow summing amplifier 16L. If a difference exists as indicated by the tracking amplifier 30L, either a bump-up (Bup) or bump-down (Bdn) signal is developed and applied to the OR gate 114, the output of which, in either case, is applied through an inverter circuit 116 to one input of the AND gate 44L. At the time when it is desired to transfer from the STANDBY mode to the RUN mode of operation, the standby command signal is removed from the flow controller 10L, whereby the inverter 40L applies an enabling signal to one input of the AND gate 44L. The tracking amplifier 30L continues to operate in a tracking mode until the value as commanded by the output of the flow summing amplifier 16L is substantially equal to that of the actual position of the economizer recirculation control valve. In particular, the tracking amplifier 30L will develop either a bump-up or a bump-down signal, thus disabling the AND gate 44L until the aforementioned difference is substantially zero. At this time, either the bump-up or bump-down signal is removed from the OR gate 48L, and an enabling signal is placed upon the other input of the AND gate 44L and upon the removal of the standby control signal, a second enabling signal is derived from the inverter circuit 40L, whereby its output resets the flip-flop 42L. In turn, the output of the flip-flop 42L, as applied to the transfer function block 24L, causes a switching operation so that the output of the flow summing amplifier 16L is now applied as by the transfer function blocks 24L and 50L, and the driver card 54L to control the economizer recirculation control valve 546.

In a further MANUAL mode of operation, the operator, as from his panel 102c (see FIG. 4) may push a pushbutton on manual/auto control block 52L to enter a desired value of the opening for the recirculation control valve 546. At the same time, a permissive also is applied to the transfer function block 50L, permitting the position value so entered to be applied to the valve 546. Though not shown in FIG. 8, a bumpless transfer is likewise provided by the flow controller 10L between the value as set by the pushbutton 52L and that position value to which the valve 546 had been previously set and is measured by the drive card 54L.

In both the MANUAL and STANDBY modes of operation, the tracking amplifier 30L is operated in a tracking mode to compare the outputs of the flow summing amplifier 16L and of the driver card 54L. In the STANDBY mode of operation, a standby control signal is applied to set the flip-flop 42L, the output of which is applied through an OR gate 28L to provide a TRACK signal to enable the tracking amplifier 30L. In the MANUAL mode of operation, the transfer function block 50L applies an input to the OR gate 28L which applies the TRACK signal to the tracking amplifier 30L. If while in the MANUAL mode, there is a difference in the outputs of the flow summing amplifier 16L and the driver card 54L, the tracking amplifier 30L provides (in a manner as explained above) an output indicative of the integral of the difference therebetween to be applied to the second subtraction circuit 18L, the output of which is applied by way of the proportional plus integral circuit 20L and the high-low limiting circuit 22L to the flow summing amplifier 16L, whose output is driven toward a value corresponding to the actual setting of the recirculation control valve 546, as indicated by the output of the driver card 54L.

Though not shown in FIG. 8, a similar circuitry as explained above with regard to the STANDBY mode is provided to ensure a bumpless transfer from the MANUAL mode of operation to the AUTOMATIC or RUN mode of operation. Briefly, if it is desired to transfer from MANUAL to AUTOMATIC, a permissive is entered to the transfer function block 50L upon the input marked MANUAL. If the output of the flow summing amplifier 16L indicative of the desired setting to which the RUN mode of operation would control the recirculation control valve 546, is the same as that set in the MANUAL mode of operation, the transfer block 50L applies the output as derived from the flow summing 16L by way of the transfer block 24L and drive card 54L to the economizer recirculation control valve 546. Otherwise, a tracking operation similar to that described above will occur, utilizing the tracking amplifier 30L to generate a bump-up or bump-down signal until the difference as measured thereby goes to zero, at which time a transfer to AUTOMATIC will occur.

Under certain emergency conditions such as a boiler trip, a priority interrupt or override signal is derived from the heat recovery steam generator protective system and is applied to the transfer block 50L, whereby the economizer recirculation valve 546 is commanded to its open position. Thus, in such emergencies, the steam is directed by the recirculation conduit 547 to the deaerator 68, and further, the transfer function block 50L is commanded into a MANUAL mode of operation, whereby the operator assumes control of the recirculation control valve 546 as through block 52L.

SYSTEM CIRCUITRY

Figure 9A:
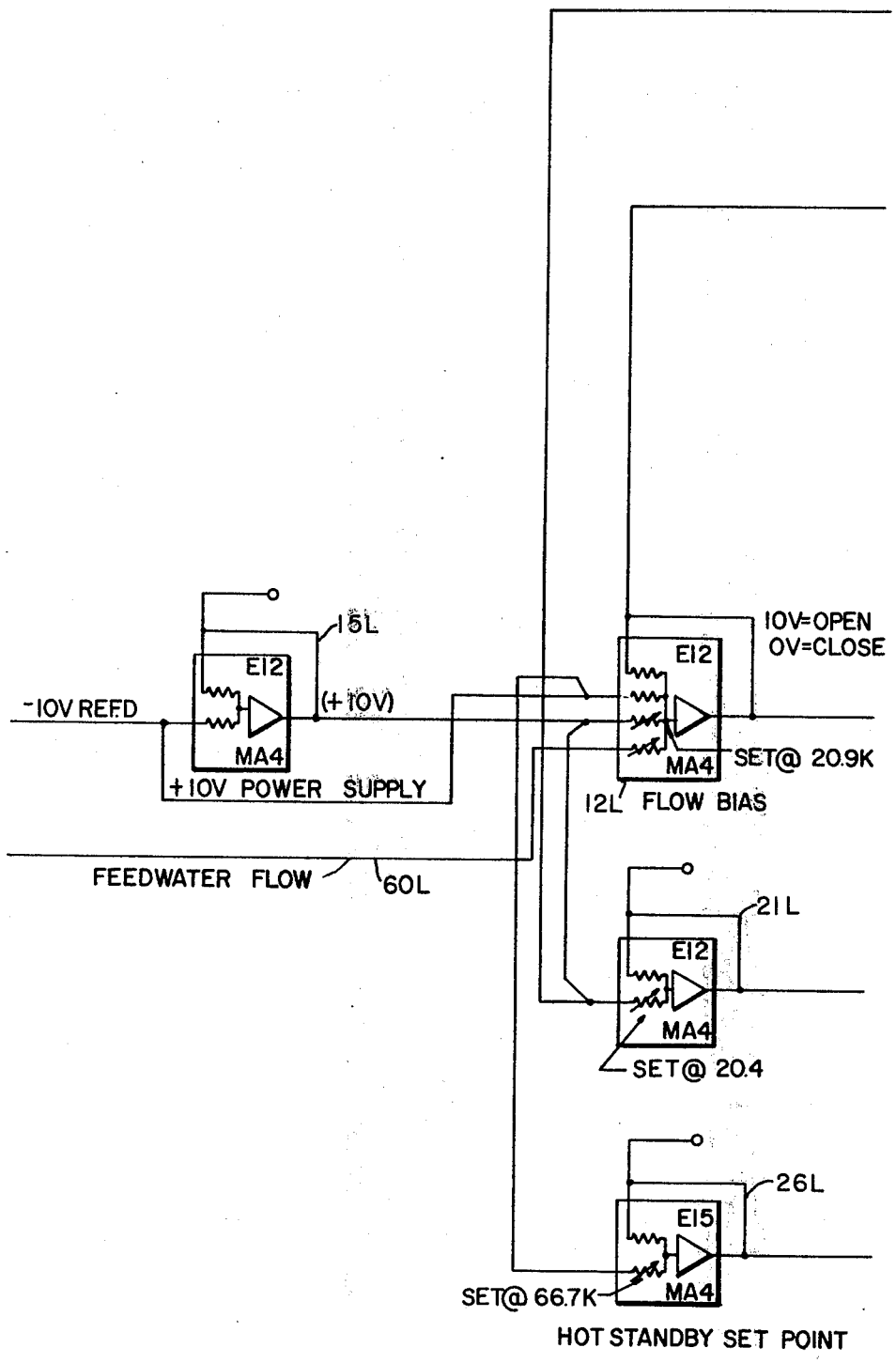
Figure 9C:
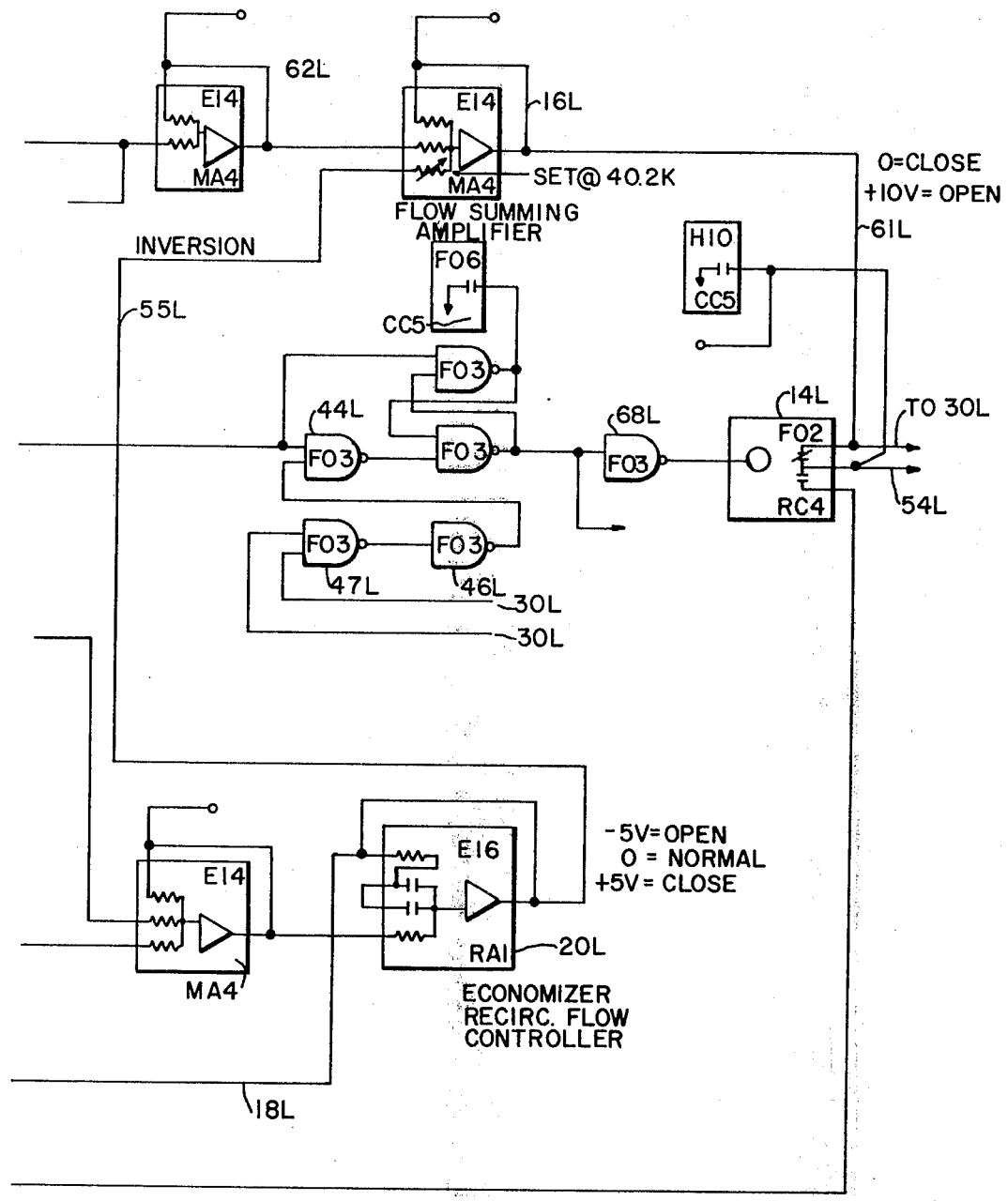
Figure 9D:
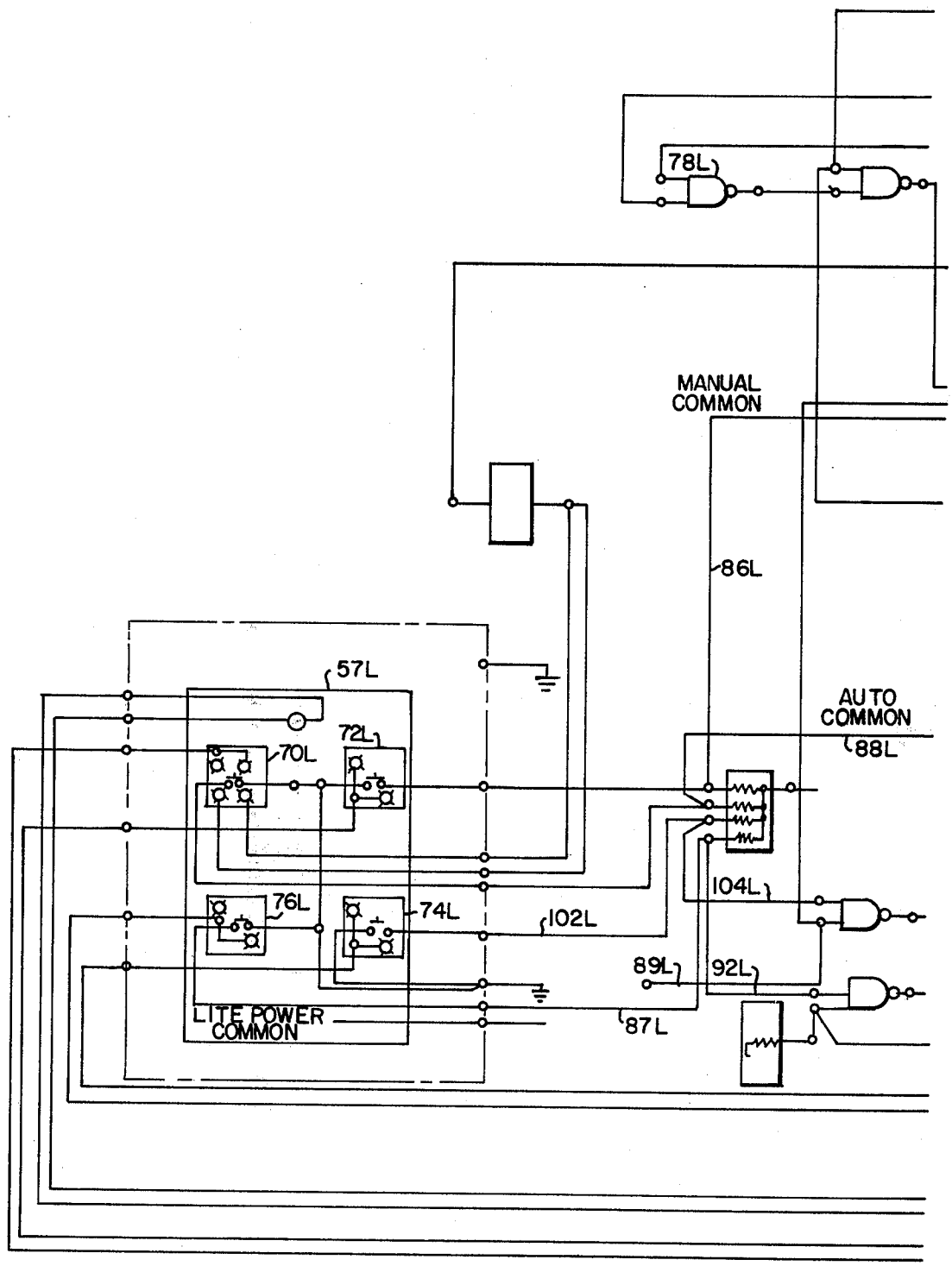
Figure 9E:
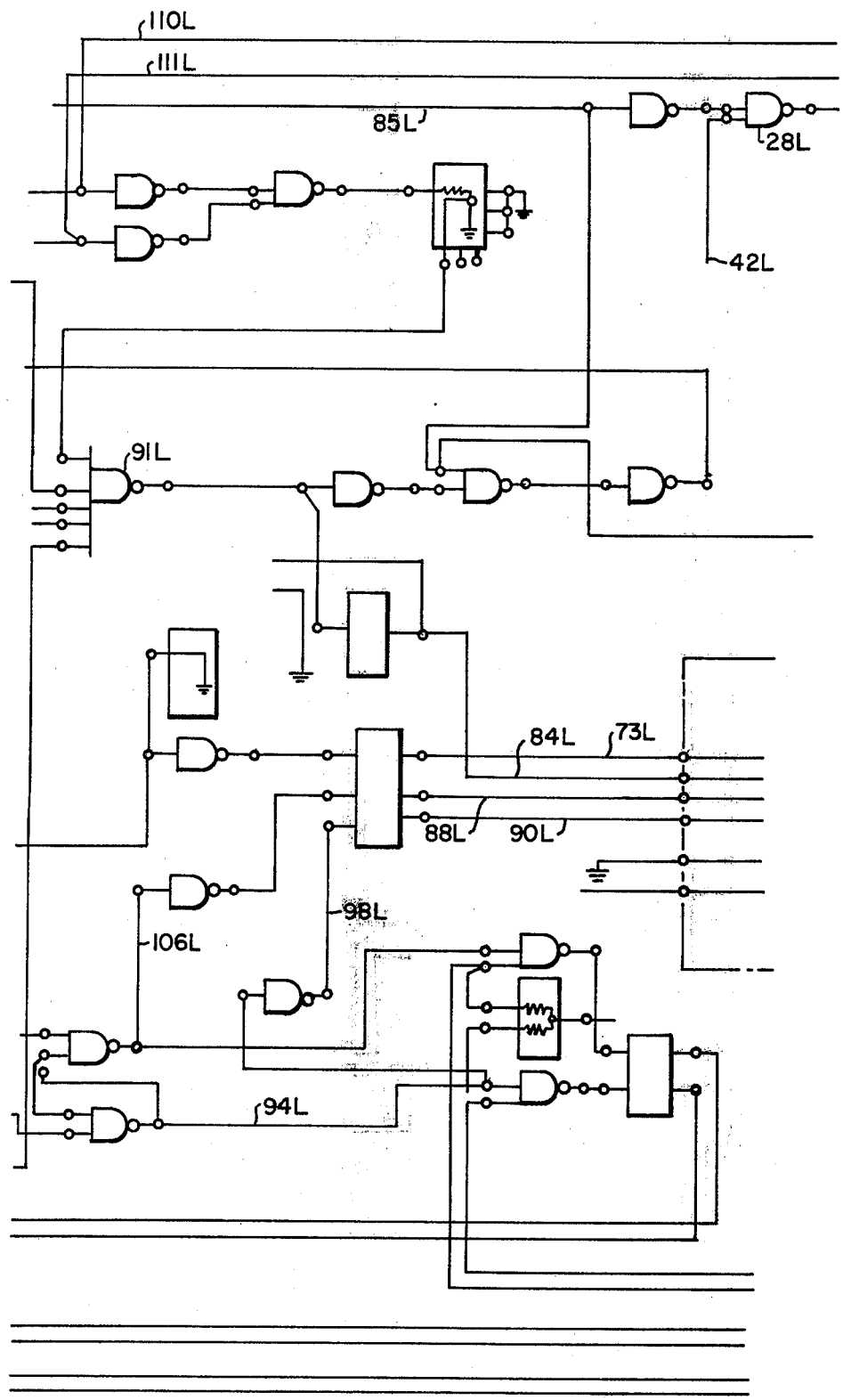
Figure 9F:
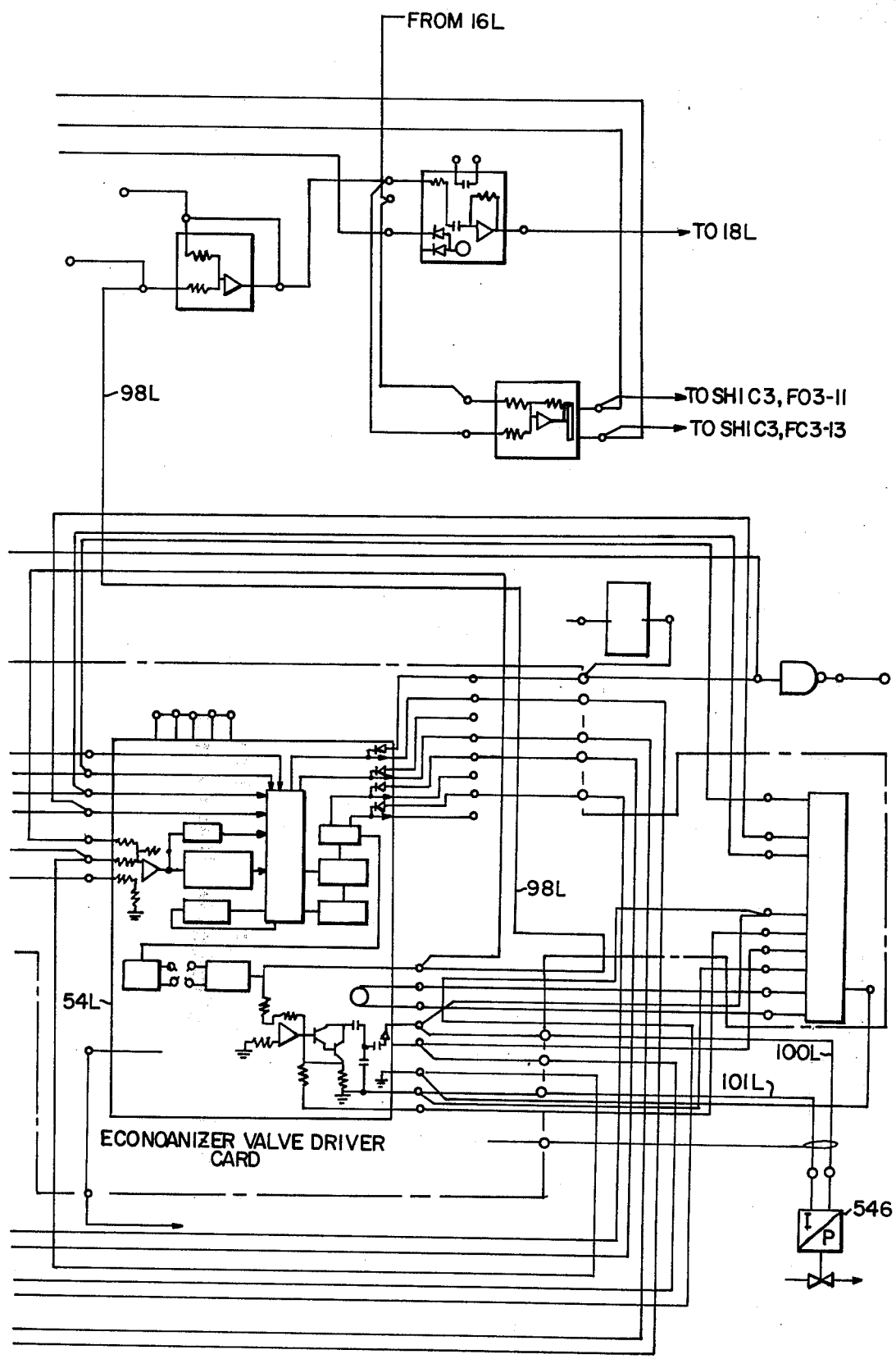

In FIGS. 9A and 9F, there is shown detailed circuitry preferably employed to implement the functions described in connection with FIG. 8. A signal indicative of the feedwater flow as derived from the flow transmitter 548 is applied along conduit 60L to the subtraction circuit 12L, along with the bias flow signal $F_T$ developed by the setpoint circuit 15L. The difference signal $F'_2$ derived from the subtraction circuit 12L is applied along conduit 59L to the summing amplifier 18L. Further, a signal $F_2$ indicative of the economizer bypass flow is applied along conduit 66L to the subtraction circuit 18L along with the calculated difference signal $F'_2$ applied along conduit 59L. The output of the subtraction circuit 18L is limited or clamped as by the high-low circuit 22L in accordance with a value as set therein by the setpoint block 21L. Further, the output of the tracking amplifier 30L (see FIG. 9F) is applied along conduit 57L to the summing amplifier 18L. In turn, the output of the subtraction circuit 18L is supplied to the proportional plus integral circuit 20L, the output of which is applied along connector 55L to the flow summing amplifier 16L. The output of the subtraction circuit 18L is also applied to the flow valve signal generator 14L, the output of which is shown as a curve in FIG. 9D as a function of the input derived from the subtraction circuit 12L. The flow valve signal generator 14L output is in turn applied through a voltage adjust circuit 62L to the flow summing amplifier 16L. The output of the flow summing amplifier 16L is applied to the transfer block 24L taking the form, as shown in FIG. 9C, of a pair of contacts, one normally closed to apply the output of the summing amplifier 16L to the driver card 54L, whereas the other pair of contacts is normally open.

The output of the flip-flop 42L is applied through an inverting circuit 68L to energize a relay coil 25L of the transfer function block 24L, whereby the second pair of contacts is closed to apply the hot standby setpoint as entered in block 26L through the now closed contacts to the driver card block 54L (see FIG. 9F). As shown in FIG. 9C, the hot standby control or status signal is applied to one input of the AND gate 44L whereas the other is derived by way of the inverter circuit 40L and a gate 46L in response to either of the bump-up or bump-down signal as derived from the tracking amplifier 30L (see FIG. 9F). Thus, in the absence of a hot standby status signal, and of a bump-up or bump-down signal, an output will be produced from the flip-flop circuit 42L and inverted to deenergize the coil 25L. When a hot standby status signal is applied, the flip-flop 42L will be set, whereby the coil 25L is energized to close the second pair of contacts and to apply the hot standby setpoint signal to the driver card 54L.

The operation of the manual/auto control block 52L is more specifically shown with regard to FIGS. 9D to 9F. With regard to FIG. 9D, the manual/auto control block 52L comprises an auto initiate and manual initiate pushbuttons 70L and 72L, respectively, appearing on the operator's panel 102c; when initiated, manual and auto command signals are applied respectively along connectors 86L and 84L and along connectors 88L and 83L to the driver card block 54L, the output of which is applied along connectors 100L and 101L to set the opening of the economizer recirculation control valve 546, as shown in FIG. 9F. Further, the manual/auto control block 52L includes up and down pushbuttons 76L and 74L whereby the operator may set in a MANUAL mode of operation the recirculation control valve 546 to the desired degree of opening by increasing or decreasing its valve position. These signals identified as Bdn and Bup signals, are respectively applied along connectors 87L, 92L, 94L, 96L and 90L, and connectors 102L, 104L, 106L and 88L to the appropriate inputs of the driver card 54L, whereby the position of the recirculation control valve 546 is decreased or increased, respectively.

With reference to FIG. 9F, outputs are derived from the flow summing amplifier 16L indicative of the recirculation control valve opening calculated in accordance with the difference between the flow bias signal $F_T$ and the feedwater flow signal $F_1$, and of the driver card 54L indicative of the setting of the recirculation control valve 546 are applied to the inputs of the tracking amplifier 30L. An enable or track demand signal is derived from the output of the gate circuit 28L in response to an input from the flip-flop 42L (see FIG. 9C) or a reject-to-manual signal as derived from the gate 91L, as will be explained. The track or enable signal is applied to the tracking amplifier 30L to perform its subtraction function and to provide the aforementioned difference signal to the summing amplifier 18L, as shown in FIG. 9B.

The functions of the transfer function block 50L are in part performed by a gate 91L which responds to a plurality of conditions to generate a reject-to-manual signal, whereby the driver card 54L is operated in that mode in accordance with the operator's set value through the manual/auto control block 52L. In particular, either a Bup or Bdn signal as derived from the tracking amplifier 30L is applied along connectors 110L and 111L to the gate 78L, the output of which is applied by way of gate 80L and connector 82L to one input of the gate 91L. Further, when the manual pushbutton 72L is depressed, a signal is applied along connector 86L to another input of the gate 91L. In addition, upon receipt of an open valve command signal as derived from the heat recovery steam generator protective system, a further signal is applied to the gate 91L. In the presence of one of these signal inputs, a reject-to-manual output is derived from gate 91L and applied by connector 84L to the appropriate input of the driver card 54L, whereby the driver card 54L is made responsive to the operator entered valve position.

What is claimed is:

1. A combined cycle electric power plant comprising:
  a. at least one gas turbine including an exit through which heated exhaust gases pass;
  b. means for generating steam at varying rates dependent upon the load placed upon said steam turbine, coupled to said gas turbine exit by transferring heat from the exhaust gases to a fluid passing through said steam generating means;
  c. a steam turbine coupled to said steam generating means and driven by the steam supplied thereby;
  d. means for generating electric power by the driving power of said turbines;
  e. condenser means for receiving and converting the spent steam from said steam turbine into condensate;
  f. means for controlling the operation of said turbines and said steam generating means;
  g. said steam generating means including first and second heat exchange tubes, each having an inlet and outlet, said outlet of said first heat exchange tube being coupled to said inlet of said second heat exchange tube, pump means for directing the condensate from said condenser serially through said first and second heat exchange tubes, the steam derived from said second heat exchange tubes being supplied to drive said steam turbine, a recirculation conduit coupled between the outlet of said first heat exchange tube and its inlet, and a recirculation control valve inserted within said recirculation conduit and selectively controlled to permit a variable recirculation flow to said inlet of said first heat exchange tube; and
  h. said controlling means comprising pump control means for actuating said pump to establish fluid flow through said first heat exchange tube at a substantially constant rate set for all loads imposed upon said steam turbine to achieve an optimum heat transfer between the exhaust gases and the fluid directed through said steam generating means to provide sufficient steam to said steam turbine at maximum load, and valve control means for controlling said valve to permit a variable, first flow through said recirculation conduit proportional to the difference between the constant flow established by said pump through said first heat exchange tube and a second flow to said second heat exchange tube, the second flow being set in accordance with the load imposed upon said steam turbine.

2. A combined cycle electric power plant as claimed in claim 1, wherein said steam generating means further includes reservoir means having an inlet coupled to the outlet of said first heat exchange tube and an outlet coupled to the inlet of said second heat exchange tube, and said controlling means includes further means for maintaining substantially constant the fluid level within said reservoir means, whereby the fluid to and from said reservoir means is determined by the amount of steam required by said steam turbine in accordance with the load demand placed upon said means for generating electric power associated therewith.

3. A combined cycle electric power plant as claimed in claim 2, wherein said constant level control means comprises means for measuring the fluid level within said reservoir means, an outlet valve for controlling the fluid flow into said reservoir means and circuit means responsive to the water level for variably opening and closing said reservoir inlet valve means to maintain substantially constant the water level within said reservoir means.

4. A combined cycle electric power plant as claimed in claim 1, wherein said steam generating means includes a preliminary heater means for supplying heat to the condensate flow derived from said condenser before being introduced into said first heat exchange tube, said recirculation conduit being coupled to said preliminary heater means to introduce heated fluid therein to thereby reduce the heat otherwise required for said preliminary heating means.

5. A combined cycle electric power plant as claimed in claim 4, wherein said preliminary heater means comprises a deaerator for additionally removing air present in the condensate derived from said condenser, and an extraction steam conduit coupled from said steam turbine to said deaerator, whereby supplemental heat may be provided by steam extracted from said steam turbine and supplied by said extraction steam conduit to said deaerator.

6. A combined cycle electric power plant as claimed in claim 1, wherein said pump control means comprises means responsive to the fluid flow between the point of intersection of said outlet of said first heat exchange tube and said recirculation conduit, and said inlet of said second heat exchange tube to provide a first signal indicative thereof, signal generator means for providing a second signal proportional to the constant fluid flow through said first heat exchange tube, and a subtraction circuit responsive to the aforementioned first and second signals to provide a difference signal to be applied to control the position of said recirculation conduit valve.

7. A combined cycle electric power plant as claimed in claim 6, wherein said valve control means further includes means responsive to the fluid flow through said recirculation conduit for providing a third signal indicative thereof, a second subtraction circuit responsive to the third signal and to the output of said first-mentioned subtraction circuit to provide a trim signal indicative of the difference therebetween, and a summing circuit responsive to the outputs of said first and second subtraction circuits for providing an output indicative of the sum thereof to be applied to control the flow through said recirculation pump means.

8. A combined cycle electric power plant as claimed in claim 6, wherein said valve control means further comprises bumpless transfer means including means for providing a signal indicative of a predetermined position to which said recirculation control valve is to be set, switch means selectively operative in a first mode wherein it applies the output of said subtraction circuit to control the position of said recirculation control valve and in a second mode wherein said switch means applies the predetermined position signal to control the opening of said recirculation control valve.

9. A combined cycle electric power plant as claimed in claim 8, wherein said valve control means further comprises bumpless transfer means comprising means responsive to the position of said recirculation control valve for providing a signal indicative of its position, a tracking amplifier responsive to the aforementioned signal and to the output signal of said subtraction circuit to provide at least one inhibit signal if the valve position indicating and subtraction circuit output signals are not substantially equal, and memory means responsive to the presence of a command operating signal to set said switch means to its second operating mode and to the absence of the command operating signal and the inhibit signal to set said switch means to its first mode of operation.

10. A combined cycle electric power plant as claimed in claim 9, wherein said tracking amplifier further provides an output indicative of the difference between the subtraction circuit output signal and the valve position indicating signal, and there is further included means responsive to the flow through said recirculation conduit to provide a signal indicative thereof and a second subtraction circuit responsive to the outputs of said first-mentioned subtraction circuit, said tracking amplifier and said recirculation flow indicator means to provide a corresponding output signal, and a summing amplifier responsive to the outputs of said first and second subtraction circuits to provide a control signal indicative of the sum thereof to be applied to said switch means.

11. A combined cycle electric power plant as claimed in claim 9, wherein there is further included an operator set means for providing a position signal indicative of the recirculation control valve opening, and second switch means operative in a first mode for applying the output of said subtraction circuit to control the position of said recirculation control valve and in a second operating mode for applying the operator position signal to said recirculation control valve.

12. A combined cycle electric power plant as claimed in claim 11, wherein said tracking amplifier is responsive to the operation of said second switch means in its second mode to enable said tracking amplifier to derive a difference signal indicative of the difference between the valve position as set by said operator set means and the output of said subtraction circuit.

13. A control system for a heat recovery steam generator for circulating varying rates of steam flow to and from a steam turbine dependent upon the varying loads placed upon the steam turbine associated with a condenser for converting the spent steam from said steam turbine to condensate, said steam generator including first and second heat exchange tubes for extracting heat from heated gases directed therepast, each having an inlet and outlet, said outlet of said first heat exchange tube being coupled to said inlet of said second heat exchange tube, the steam derived from said second heat exchange tube being supplied to drive the steam turbine, pump means for directing the condensate from said condenser serially to said first and second heat exchange tubes, a recirculation conduit coupled from the outlet of said first heat exchange tube and its inlet, and a recirculation control valve inserted within said recirculation conduit and selectively controlled to permit a variable recirculation flow to said inlet of said first heat exchange tube, said control system comprising:
   a. pump control means for actuating and controlling said pump means to establish a fluid flow through said first heat exchange tube at a substantially constant rate set for all loads imposed upon the steam turbine to achieve an optimum heat transfer between the heated gases and the condensate directed therethrough and to provide sufficient steam to the steam turbine at maximum load; and
   b. valve control means for controlling said valve to permit a first variable flow through said recirculation conduit proportional to the difference between the constant flow established by said pump through said first heat exchange tube and a second required flow to said second heat exchange tube, the second flow being set in accordance with the load imposed upon the steam turbine.

14. A control system as claimed in claim 13, wherein said pump control means comprises means responsive to the fluid flow between the point of intersection of said outlet of said first heat exchange tube and said recirculation conduit, and said inlet of said second heat exchange tube to provide a first signal indicative thereof, signal generator means for providing a second signal proportional to the constant fluid flow through said first heat exchange tube, and a subtraction circuit responsive to the aforementioned first and second signals to provide a difference signal to be applied to control the position of said recirculation conduit valve.

15. A control system as claimed in claim 14, wherein said valve control means further includes means responsive to the fluid flow through said recirculation conduit for providing a third signal indicative thereof, a second subtraction circuit responsive to the third signal and to the output of said first-mentioned subtraction circuit to provide a trim signal indicative of the difference therebetween, and a summing circuit responsive to the outputs of said first and second subtraction circuits for providing an output indicative of the sum thereof to be applied to control the flow through said recirculation pump means.

16. A control system as claimed in claim 14, wherein said valve control means further comprises bumpless transfer means including means for providing a signal indicative of a predetermined position to which said recirculation control valve is to be set, switch means selectively operative in a first mode wherein it applies the output of said subtraction circuit to control the position of said recirculation control valve and in a second mode wherein said switch means applies the predetermined position signal to control the opening of said recirculation control valve.

17. A control system as claimed in claim 16, wherein said valve control means further comprises bumpless transfer means comprising means responsive to the position of said recirculation control valve for providing a signal indicative of its position, a tracking amplifier responsive to the aforementioned signal and to the output signal of said subtraction circuit to provide at least one inhibit signal if the valve position indicating and subtraction circuit output signals are not substantially equal, and memory means responsive to the presence of a command operating signal to set said switch means to its second operating mode and to the absence of the command operating signal and the inhibit signal to set said switch means to its first mode of operation.

18. A control system as claimed in claim 17, wherein said tracking amplifier further provides an output indicative of the difference between the subtraction circuit output signal and the valve position indicating signal and there is further included means responsive to the flow through said recirculation conduit to provide a signal indicative thereof and a second subtraction circuit responsive to the outputs of said first-mentioned subtraction cirucit, said tracking amplifier and said recirculation flow indicator means to provide a corresponding output signal, and a summing amplifier responsive to the outputs of said first and second subtraction circuits to provide a control signal indicative of the sum thereof to be applied to said switch means.

19. A control system as claimed in claim 17, wherein there is further included an operator set means for providing a position signal indicative of the recirculation control valve opening, and second switch means operative in a first mode for applying the output of said subtraction circuit to control the position of said recirculation control valve and in a second operating mode for applying the operator position signal to said recirculation control valve.

20. A control system as claimed in claim 19, wherein said tracking amplifier is responsive to the operation of said second switch means in its second mode to enable said tracking amplifier to derive a difference signal indicative of the difference between the valve position as set by said operator set means and the output of said subtraction circuit.

21. A steam turbine power plant comprising:
   a. steam generator means responsive to heated gases directed therethrough for converting a fluid into steam and supplying the steam to a steam turbine at a varying rate dependent upon the load imposed upon said steam turbine;
   b. said steam turbine coupled to said steam generating means and driven by the steam supplied thereby;
   c. means for generating electric power by the driving power of said steam turbine;
   d. a condenser for receiving and converting the spent steam from said steam turbine into condensate;
   e. means for controlling the operation of said steam turbine and said steam generating means;
   f. said steam generating means including first and second heat exchange tubes, the steam derived from said second heat exchange tube being supplied to said steam turbine, each having an inlet and outlet, said outlet of said first heat exchange tube being coupled to said inlet of said second heat exchange tube, pump means for directing the condensate from said condenser serially through said first and second heat exchange tubes, a recirculation conduit coupled between the outlet of said first heat exchange tube and its inlet, and a recirculation control valve inserted within said recirculation conduit and selectively controlled to permit a first, variable recirculation flow to said inlet of said first heat exchange tube; and g. said controlling means comprising pump control means for actuating said pump to establish fluid flow through said first heat exchange tube at a substantially constant rate for all loads imposed upon said steam turbine to achieve an optimum heat transfer between the heated gases and the condensate directed through said first heat exchange tube and to provide sufficient steam to said steam turbine at its maximum load, and valve control means for controlling said valve to permit the first, variable flow through said recirculation conduit proportional to the difference between the constant flow established by said pump through said first heat exchange tube and a second flow to said second heat exchange tube, the second flow being set in accordance with the load imposed upon said steam turbine.

22. A steam turbine electric power plant as claimed in claim 21, wherein said steam generating means further includes reservoir means having an inlet coupled to the outlet of said first heat exchange tube and an outlet coupled to the inlet of said second heat exchange tube, and said controlling means includes further means for maintaining substantially constant the fluid level within said reservoir means, whereby the fluid to and from said reservoir means is determined by the amount of steam required by said steam turbine in accordance with the load demand placed upon said means for generating electric power associated therewith.

23. A steam turbine electric power plant as claimed in claim 22, wherein said constant level control means comprises means for measuring the fluid level within said reservoir means, an outlet valve for controlling the fluid flow into said reservoir means and circuit means responsive to the water level for variably opening and closing said reservoir inlet valve means to maintain substantially constant the water level within said reservoir means.

24. A steam turbine electric power plant as claimed in claim 21, wherein said steam generating means includes a preliminary heater means for supplying heat to the condensate flow derived from said condenser before being introduced into said first heat exchange tube, said recirculation conduit being coupled to said preliminary heater means to introduce heated fluid therein to thereby reduce the heat otherwise required for said preliminary heating means.

25. A steam generating electric power plant as claimed in claim 24, wherein said preliminary heater means comprises a deaerator for additionally removing air present in the condensate derived from said condenser, and an extraction steam conduit coupled from said steam turbine to said deaerator, whereby supplemental heat may be provided by steam extracted from said steam turbine and supplied by said extraction steam conduit to said deaerator.

26. A combined cycle electric power plant comprising:
a. at least one gas turbine including an exit through which heated exhaust gases pass;
b. means for generating steam at varying rates dependent upon the load placed upon said steam turbine, coupled to said gas turbine exit by transferring heat from the exhaust gases to a fluid passing through said steam generating means;
c. a steam turbine coupled to said steam generating means and driven by the steam supplied thereby;
d. means for generating electric power by the driving power of said turbines;
e. condenser means for receiving and converting the spent steam from said steam turbine into condensate;
f. means for controlling the operation of said turbines and said steam generating means;
g. said steam generating means including first and second heat exchange tubes, each having an inlet and outlet, said outlet of said first heat exchange tube being coupled to said inlet of said second heat exchange tube, pump means for directing the condensate from said condenser serially through said first and second heat exchange tubes, the steam derived from said second heat exchange tube being supplied to drive said steam turbine, a recirculation conduit coupled between the outlet of said first heat exchange tube and its inlet, and a recirculation control valve inserted within said recirculation conduit and selectively controlled to permit a variable recirculation flow to said inlet of said first heat exchange tube;
h. said controlling means comprising pump control means for actuating said pump to establish a fluid flow at a substantially constant rate set for all loads imposed upon said steam turbine to achieve an optimum heat transfer between the exhaust gases and the fluid directed through said steam generating means and to provide sufficient steam to said steam turbine at maximum load, and valve control means for controlling said valve to permit a variable, first flow through said recirculation conduit proportional to the difference between the constant flow established by said pump through said first heat exchange tube and a second flow to said second heat exchange tube, the second flow being set in accordance with the load imposed upon said steam turbine; and
i. condensate storage means coupled to said recirculation conduit to receive the recirculated flow and to receive the condensate from said condenser means, for preheating the condensate with heat stored in the recirculated flow before directing the preheated condensate to said inlet of said first heat exchange tube.

27. A steam turbine power plant comprising:
a. steam generator means responsive to heated gases directed therethrough for converting a fluid into steam and supplying the steam to a steam turbine at a varying rate dependent upon the load imposed upon said steam turbine;
b. said steam turbine coupled to said steam generating means and driven by the steam supplied thereby;
c. means for generating electric power by the driving power of said steam turbine;
d. a condenser for receiving and converting the spent steam from said steam turbine into condensate;
e. means for controlling the operation of said steam turbine and said steam generating means;
f. said steam generating means including first and second heat exchange tubes, the steam derived from said second heat exchange tube being supplied to said steam turbine, each having an inlet and outlet, said outlet of said first heat exchange tube being coupled to said inlet of said second heat exchange tube, pump means for directing the condensate from said condenser serially through said first and second heat exchange tubes, a recirculation conduit coupled between the outlet of said first heat exchange tube and its inlet, and a recirculation control valve inserted within said recirculation conduit and selectively controlled to permit a first, variable recirculation flow to said inlet of said first heat exchange tube;

g. said controlling means comprising pump control means for actuating said pump to establish fluid flow through said first heat exchange tube at a substantially constant rate for all loads imposed upon said steam turbine to achieve an optimum heat transfer between the heated gases and the condensate directed through said first heat exchange tube and to provide sufficient steam to said steam turbine at its maximum load, and valve control means for controlling said valve to permit the first, variable flow through said recirculation conduit proportional to the difference between the constant flow established by said pump through said first heat exchange tube and a second flow to said second heat exchange tube, the second flow being set in accordance with the load imposed upon said steam turbine; and h. storage means coupled to said recirculation conduit to receive the recirculated flow and to receive the condensate from said condenser for preheating the condensate by the heat stored in the recirculated flow before directing the preheated condensate to said first heat exchange tube.

* * * * *